(12) United States Patent
Grosvenor et al.

(10) Patent No.: US 7,426,478 B2
(45) Date of Patent: *Sep. 16, 2008

(54) METHOD AND APPARATUS PROVIDING A SUPPLY CHAIN MANAGEMENT SYSTEM USEFUL IN OUTSOURCED MANUFACTURING

(75) Inventors: Franklin Grosvenor, Los Altos, CA (US); Arvind Bedi, Santa Clara, CA (US); John Turk, Palo Alto, CA (US); Richard Roney, Menlo Park, CA (US); Timothy Butzow, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 11/799,671

(22) Filed: May 1, 2007

(65) Prior Publication Data

US 2007/0203770 A1 Aug. 30, 2007

Related U.S. Application Data

(63) Continuation of application No. 09/846,134, filed on Apr. 30, 2001, now Pat. No. 7,216,086.

(51) Int. Cl.
*G06F 9/46* (2006.01)
(52) U.S. Cl. .............................. 705/7; 705/28
(58) Field of Classification Search ................ 705/7, 705/10, 27–28
See application file for complete search history.

(56) References Cited

U.S. PATENT DOCUMENTS 5,682,728 A 11/1997 DeBusk et al.

(Continued)

FOREIGN PATENT DOCUMENTS

WO WO 9724691 A1 7/1997

(Continued)

OTHER PUBLICATIONS

Ulieru et al "A Multi-Agent System for On-Line Fault Recovery of Intelligent Manufacturing Systems", Dec. 1999, IEEE, pp. 849-853.

(Continued)

*Primary Examiner*—Romain Jeanty
(74) *Attorney, Agent, or Firm*—Hickman Palermo Truong & Becker LLP

(57) ABSTRACT

A method is disclosed for automatically identifying and resolving one or more discrepancies in an outsourced manufacturing supply chain in which a plurality of supply chain partners participate. According to this aspect, information representing one or more supply chain events is received from each of the supply chain partners in a database with which each of the supply chain partners may communicate over a public network. One or more rules are applied periodically to the supply chain event information, resulting in generating one or more alerts pertaining to one or more discrepancies that are found in the supply chain event information. The alerts are communicated to the supply chain partners who are participating in a transaction to which the discrepancies relate. Each alert remains active until second information is received that represents a second supply chain event that resolves the alert. According to one feature, the alerts are periodically escalated until they are resolved. A hub-and-spoke supply chain management system that facilitates the foregoing method, and other features, is also disclosed. In other aspects, the invention encompasses a computer apparatus, a computer readable medium, and a carrier wave configured to carry out the foregoing steps.

19 Claims, 13 Drawing Sheets

U.S. PATENT DOCUMENTS

| | | |
|---|---|---|
| 5,884,300 A | 3/1999 | Brockman |
| 5,943,484 A | 8/1999 | Milne et al. |
| 5,946,662 A | 8/1999 | Ettl et al. |
| 5,953,707 A | 9/1999 | Huang et al. |
| 5,963,919 A | 10/1999 | Brinkley et al. |
| 5,970,465 A | 10/1999 | Dietrich et al. |
| 5,974,395 A | 10/1999 | Bellini et al. |
| 5,983,198 A | 11/1999 | Mowery et al. |
| 6,041,267 A | 3/2000 | Dangat et al. |
| 6,047,290 A | 4/2000 | Kennedy et al. |
| 6,049,742 A | 4/2000 | Milne et al. |
| 6,055,519 A | 4/2000 | Kennedy et al. |
| 6,085,493 A | 7/2000 | DeBusk et al. |
| 6,115,690 A | 9/2000 | Wong |
| 6,119,149 A | 9/2000 | Notani |
| 6,151,582 A | 11/2000 | Huang et al. |
| 6,810,383 B1 | 10/2004 | Loveland |
| 6,889,197 B2 | 5/2005 | Lidow |
| 6,947,903 B1 | 9/2005 | Perry |
| 7,069,235 B1 | 6/2006 | Postelnik et al. |
| 7,359,874 B2 * | 4/2008 | Seaman et al. ............... 705/28 |
| 2002/0099579 A1 | 7/2002 | Stowell et al. |

FOREIGN PATENT DOCUMENTS

WO      WO 0051038 A1      8/2000

OTHER PUBLICATIONS

Rupp et al "Fine Planning for Supply Chains in Semiconductor Manufacture", Nov. 2000, Journal of Materials Processing Technology, vol. 107, Issue 1-3, pp. 1-13.

Richards et al "Flow of Orders Through a Virtual Enterprise Their Proactive Planning and Scheduling, and Reactive Control", Aug. 1997, Computing & Control Engineering Journal, pp. 173-179.

Becker et al "Specifying Information Systems For Business Process Integration—A Management Perspective", Information Systems and e-Business Management, pp. 231-263.

* cited by examiner

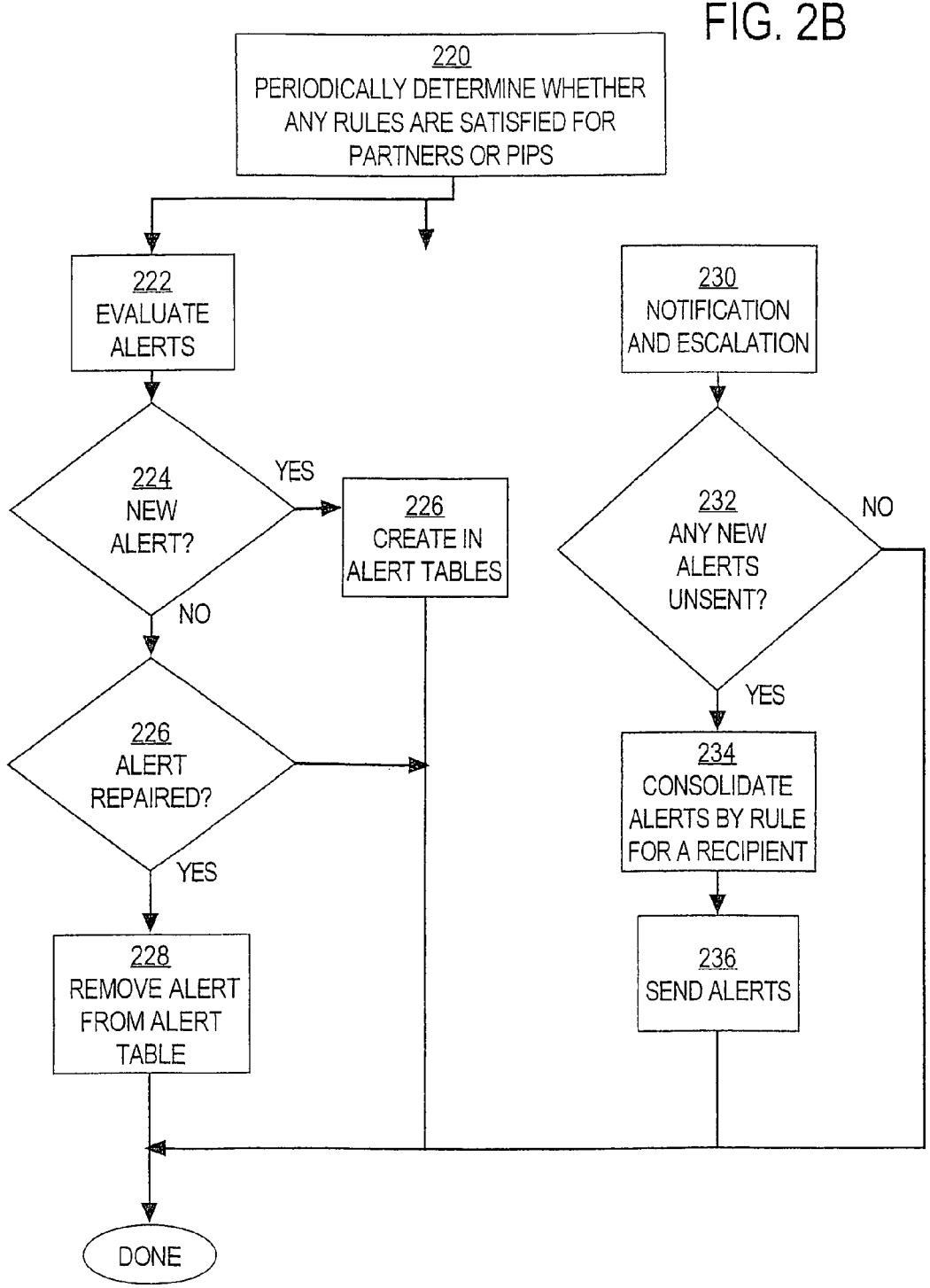

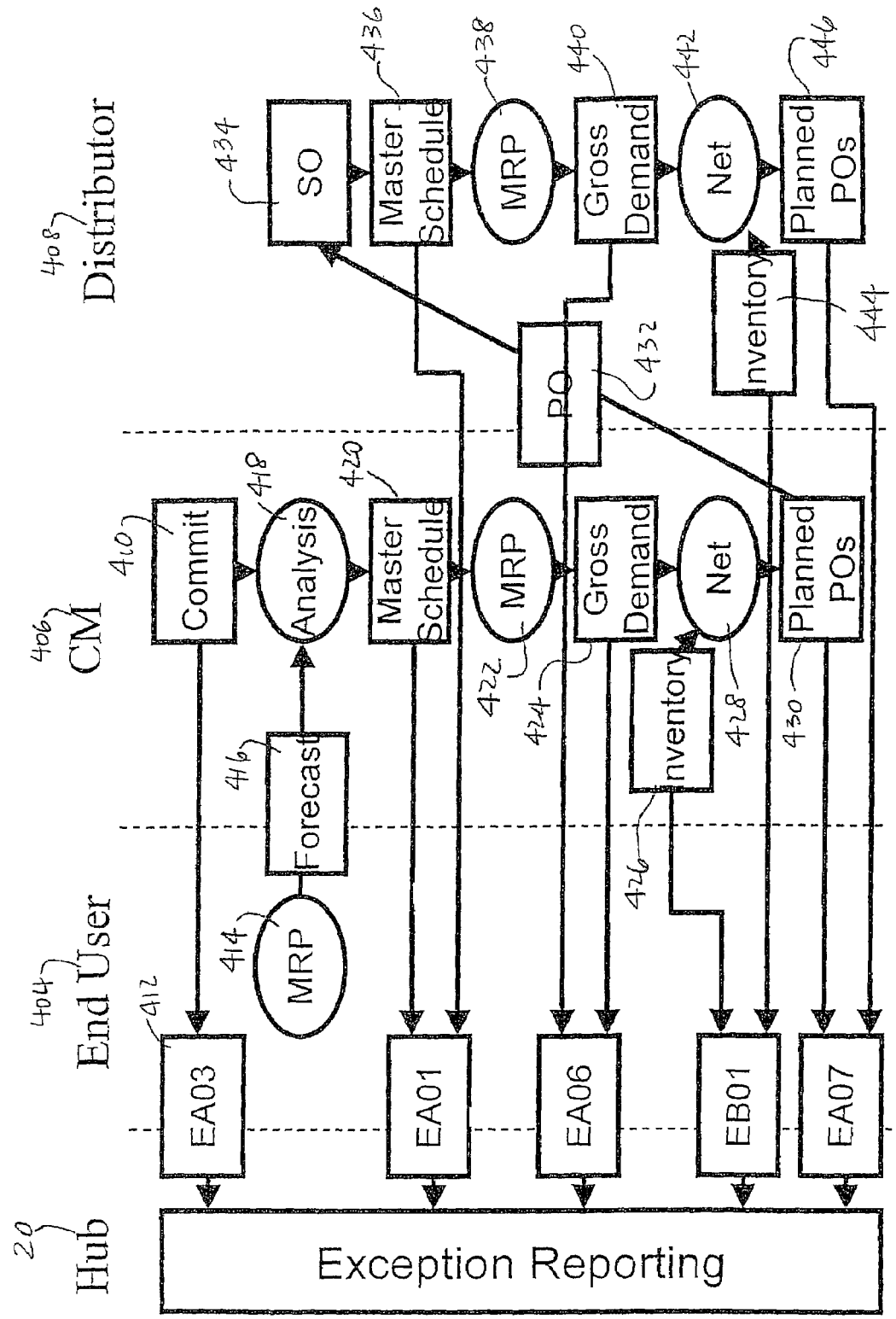

METHOD AND APPARATUS PROVIDING A SUPPLY CHAIN MANAGEMENT SYSTEM USEFUL IN OUTSOURCED MANUFACTURING

RELATED APPLICATIONS

This application is a continuation of U.S. patent application Ser. No. 09/846,134, filed Apr. 30, 2001, now U.S. Pat. No. 7,216,086 the contents of which are fully incorporated herein.

FIELD OF INVENTION

The present invention generally relates to computer-assisted management of manufacturing processes such as supply chain management. The invention relates more specifically to a method and apparatus providing a supply chain management system useful in outsourced manufacturing, including a method of automatically identifying and resolving one or more discrepancies in an outsourced manufacturing supply chain in which a plurality of supply chain partners participate.

BACKGROUND OF THE INVENTION

Outsourced manufacturing is a method of making products or services in which a first enterprise researches and develops products and then contracts with one or more other enterprises to actually make and deliver the products, or their components or subassemblies. Large business enterprises involved in developing many different products and services have rapidly turned to outsourced manufacturing in recent years as a way to provide flexibility in their operations. For example, if a research enterprise has developed a product and suddenly receives a large increase in orders for the product, the research enterprise can contract with multiple vendors to make and deliver the product, and then discontinue the contracts when order volume decreases. Without outsourced manufacturing, an enterprise is required to manage regular changes in manufacturing capacity, at significant direct and indirect cost to the enterprise.

However, one disadvantage of using outsourced manufacturing on a large-scale basis is that the outsourcing enterprise loses a degree of control over the manufacturing process. For example, if a contract manufacturer fails to receive timely deliveries of needed parts from one or more suppliers, the manufacturer's production schedule may slip, and the outsourcing enterprise cannot deliver products to its customers on time. Moreover, the outsourcing enterprise typically receives no information about the existence or nature of such shortages or other problems that arise far down the supply chain, because the outsourcing enterprise has no direct contractual relationship or communication with the downstream suppliers. The problems become known only when the contract manufacturer informs the outsourcing enterprise about a change in delivery schedule. When the outsourcing enterprise is a very large business organization with numerous products and an annual sales volume amounting to billions of dollars, these problems become acute and unacceptable.

Based on the foregoing, there is a need for a way to provide management of an outsourcing enterprise with visibility of events occurring in all parts of the supply chain, i.e., end-to-end supply chain visibility. In addition, management needs analysis tools to understand the impact of events occurring deep in the supply chain and to suggest relevant resolution options.

One approach to this need is to provide an enterprise resource planning (ERP) software system at the outsourcing enterprise, and require all supply chain partners of the outsourcing enterprise to deploy and use the same ERP system so that compatible data files can be interchanged. Providers of ERP software systems include Baan, Oracle, SAP AG, and others. Unfortunately, deployment of such ERP systems including licensing, installation, and training is extremely expensive. The cost is normally beyond the resources of medium-sized or smaller supply chain partners who otherwise produce quality products and form essential parts of the supply chain.

Still another need in this context relates to communicating instructions and information to supply chain partners who are located far down the supply chain from the outsourcing enterprise. In a typical enterprise, when one or more new orders are received for a particular product, the enterprise will initiate and communicate one or more new demand signals to its contract manufacturers, asking them to start making products that the enterprise can use to fulfill its orders. If the contract manufacturers need new supplies of parts, they must contact all appropriate vendors with separate signals or requests to supply the parts. If such suppliers also need component materials or other parts, they must send separate signals or requests further down the supply chain. This process results in delay in ultimately completing the products needed by the enterprise, and increases manufacturing costs. There is a need for the outsourcing enterprise to communicate new demand signals as far down the supply chain as necessary in a substantially concurrent way, and as directly as possible, so that all supply chain partners know as soon as possible that additional products are needed by the enterprise.

Similarly, there is a need to communicate other kinds of signals, requests or instructions from the outsourcing enterprise to all supply chain partners. For example, the enterprise may wish to send material move signals, supply status requests, and receive exception conditions to or from all entities involved in the supply chain.

Another deficiency of past approaches pertains to decision-making. In general, existing systems provide no automated way to request action when problems arise, and no way to guarantee that appropriate action is taken in response to problems. Thus, there is a need for a way to issue alert messages in response to problems, and to enforce an organized process of responding to and acting on the alerts.

There is also a need for a way to facilitate direct communication among the enterprise and downstream supply chain partners with which the enterprise has no direct contractual or transactional relationship.

SUMMARY OF THE INVENTION

The present invention comprises, in one aspect, a method for automatically identifying and resolving one or more discrepancies in an outsourced manufacturing supply chain in which a plurality of supply chain partners participate. According to this aspect, information representing one or more supply chain events is received from each of the supply chain partners in a database with which each of the supply chain partners may communicate over a public network. One or more rules are applied periodically to the supply chain event information, resulting in generating one or more alerts pertaining to one or more discrepancies that are found in the supply chain event information. The alerts are communicated to the supply chain partners who are participating in a transaction to which the discrepancies relate. Each alert remains active until second information is received that represents a second supply chain event that resolves the alert.

According to one feature, the alerts are periodically escalated until they are resolved.

A hub-and-spoke supply chain management system that facilitates the foregoing method, and other features, is also disclosed.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B is a flow diagram of a process of carrying out rule and alert processing.

FIG. 4 is a block diagram of a process of providing planning information to a supply chain management system.

DETAILED DESCRIPTION OF THE PREFERRED EMBODIMENT

A method and apparatus providing a supply chain management system useful in outsourced manufacturing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In general, in one embodiment, the disclosed method and apparatus uses a supply chain management database to enable a complete supply chain to have visibility of exceptions and critical success factors. A configurable user interface provides access to view and analyze critical alerts, exceptions and success factors. Electronic alert notification occurs in response to any business rule violation, and alerts may be dispatched via e-mail, pager or using a software application programming interface (API). Advanced analysis, reporting, and data mining is available through integration with an online analysis database system.

The description herein is structured according to the following outline:
1. STRUCTURAL OVERVIEW
2. FUNCTIONAL OVERVIEW
   2.1 GENERAL PROCESS FLOW
   2.2 INFORMATION DELIVERY
   2.3 USER INTERFACE
   2.4 RULES AND ALERTS; RULE CONFIGURATION AND PROCESSING
   2.5 ALERT ESCALATION
   2.6 ALERT DELIVERY
   2.7 SOURCES OF DATA FROM PARTNERS
   2.8 ON-DEMAND REPORTS
   2.9 SECURITY
3. RULE LOGIC
4. HARDWARE OVERVIEW
5. EXTENSIONS AND ALTERNATIVES In this description, the following acronyms and terms have the following definitions:

BOM—Bill of Materials; a list of the materials or components that make up a finished product.

BPO—Blanket Purchase Order.

BSO—Blanket Sales Order.

CM—Contract Manufacturer.

Demand-Side Partner—An entity in the supply chain that is receiving something, often a component of a product, a chassis, or an assembly, from another entity in the supply chain. A synonym is "Buyer."

ERP—Enterprise Resource Planning.

MPS—Master Production Schedule.

MRP—Manufacturing Resource Planning.

PIP—Partner Integration Process.

PM—Part Master; a reference database of a partner that stores basic information about the partner's parts or components.

P/N—Part Number.

PO—Purchase Order.

SO—Sales Order.

Supply-Side Partner—An entity in the supply chain that is supplying something, often a component of a product, a chassis, or an assembly, to another entity in the supply chain. A synonym is "Seller."

Time Fence—A period of time for performing a task, defined by a start time, end time, and agreed-upon percentage of time by which the start time or end time may vary. Time fences are the subjects of advance agreement ("Time Fence Agreement") between partners.

WO—Work Order.

XML—Extensible Markup Language.

1. Structural Overview

Figure 1A:
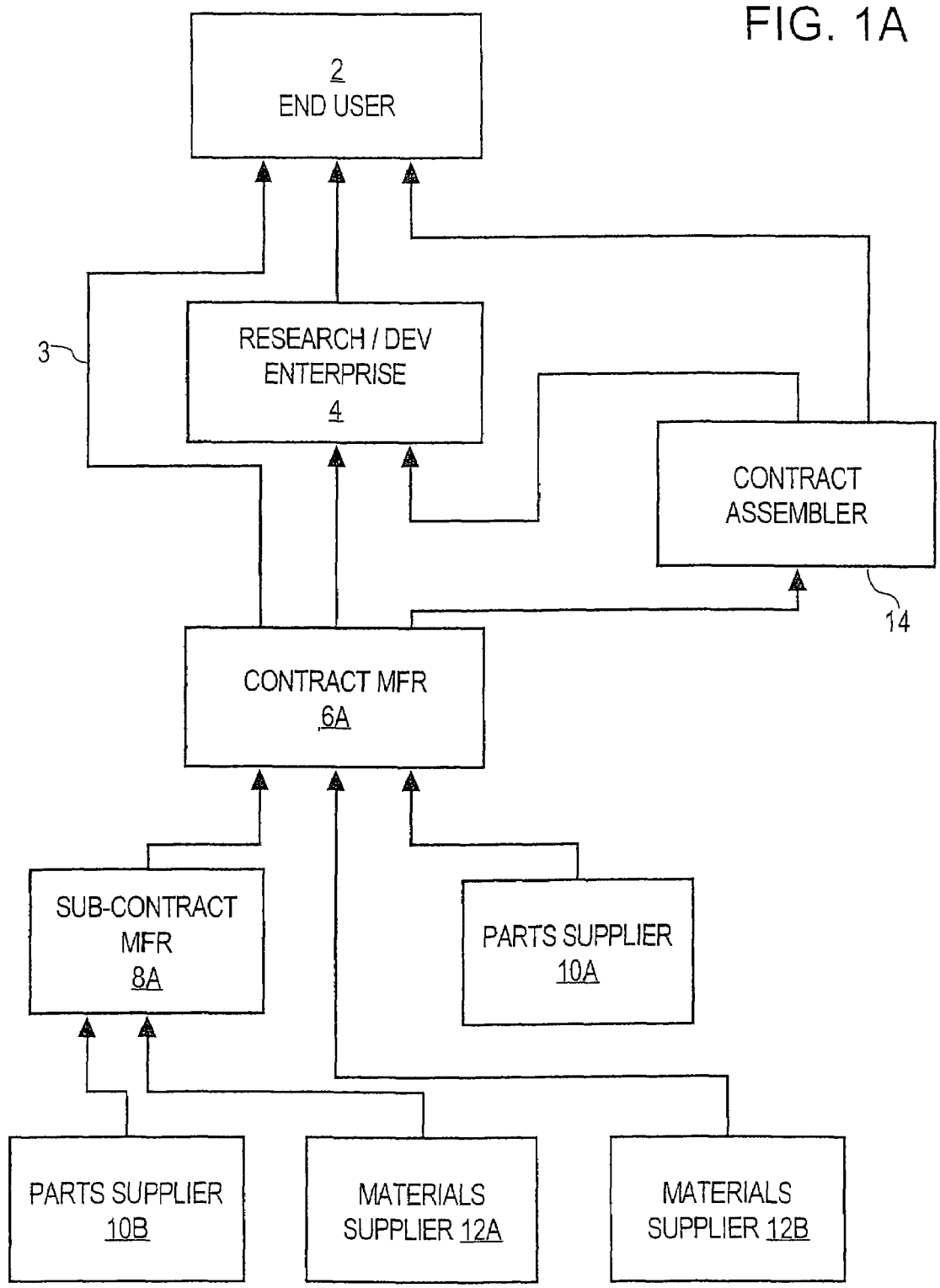
FIG. 1A is a block diagram illustrating a supply chain context in which an embodiment may be used.

FIG. 1A is a block diagram illustrating a supply chain context in which an embodiment may be used. An end user 2 purchases, uses or receives products or services from a research and development enterprise 4, which carries out product development, engineering, design, and related activities. For manufacturing of its products, however, enterprise 4 outsources to one or more contract manufacturers 6A and contract assemblers 14. Where the products of enterprise 4 are computer-related, for example, contract manufacturer 6A and contract assembler 14 may be involved in board-level fabrication, chassis assembly, etc. They may also carry out testing, quality assurance, and shipping of products to end user 2. Alternatively, contract manufacturer 6A and contract assembler 14 may ship assembled products to enterprise 4 for final testing, quality assurance, and shipping to a customer.

The contract manufacturer 6A and contract assembler 14 may receive component parts and raw materials from one or more sub-contract manufacturers 8A, parts suppliers 10A, 10B, and materials suppliers 12A, 12B. The contract manufacturer 6A and contract assembler 14 also may sub-contract out for services that do not involve direct supply of tangible materials, parts or assemblies, such as chassis painting, soldering, etc.

For purposes of illustrating a clear example, a small number of entities are shown in FIG. 1A, however, in a practical business environment there may be hundreds or thousands of parties participating in the entire supply chain. Although all entities depicted in FIG. 1A participate in the supply chain and considered are important supply chain partners, enterprise 4 is the focus of this description and is considered a central point or hub of information, command and control, and the other entities are viewed as spokes or supporting organizations around the hub. Further, each of the partners have direct logical connections to supply chain management system 20 and can contribute information to the system, receive alerts from the system, and generate reports relating to the supply chain and its other partners.

Figure 1B:
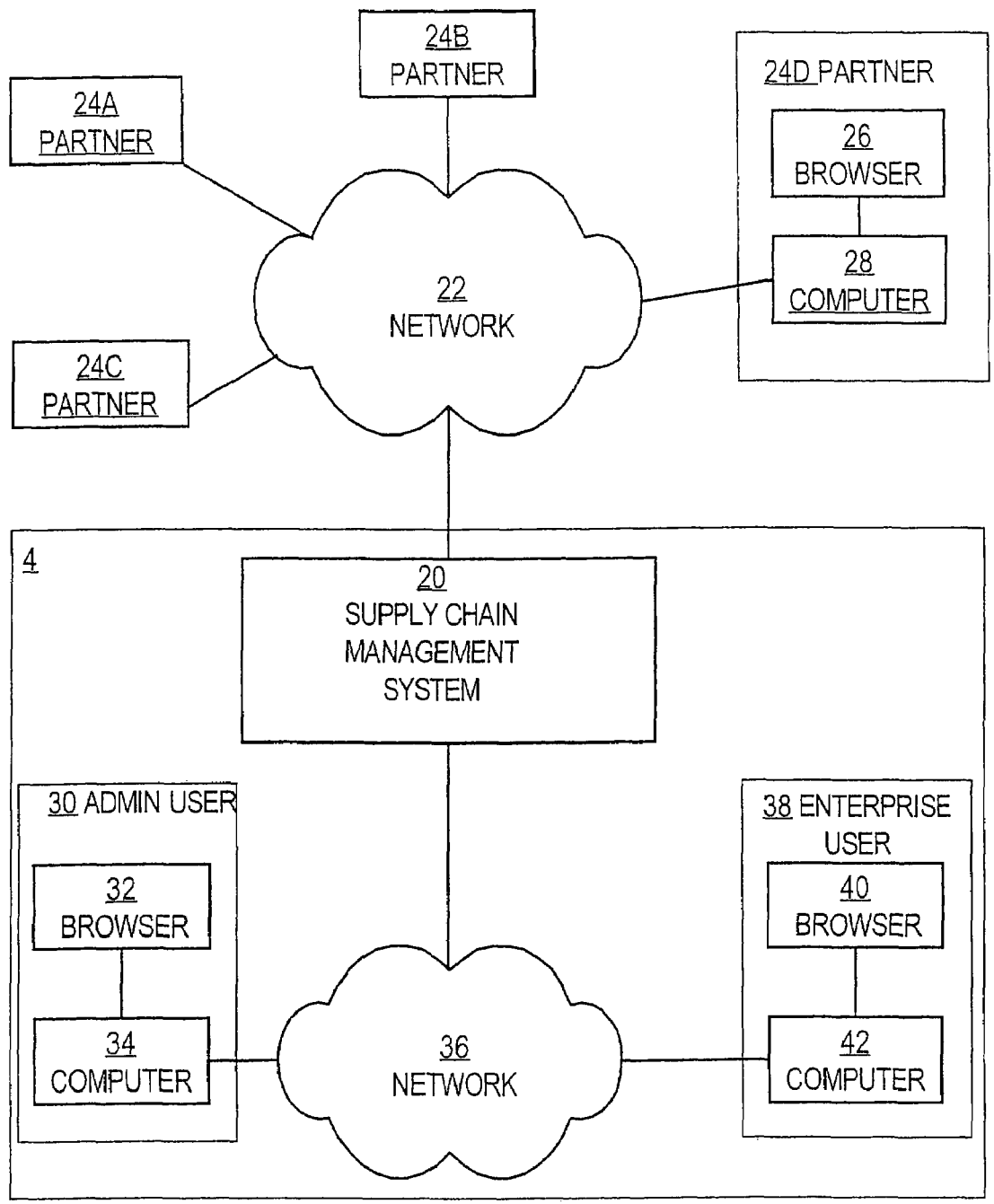
FIG. 1B is a block diagram showing a supply chain management system as related to supply chain partners.

FIG. 1B is a block diagram showing a supply chain management system as related to supply chain partners. Any number of supply chain partners 24A, 24B, 24C, 24D are communicatively coupled to a network 22. Supply chain management system 20, which is associated with enterprise 4 of FIG. 1A, is also communicatively coupled to network 22, which may be one or more local area networks, wide area networks, internetworks, or public internetwork such as the Internet. In this arrangement, supply chain management system 20 is related to partners 24A, 24B, 24C, etc., as a hub to spokes. As shown by example for partner 24D, each of the partners communicates through network 22 with supply chain management system 20 using a computer 28 that executes a browser 26.

One or more administrative clients or users 30 are communicatively coupled to supply chain management system 20 directly or through one or more local networks 36. Each administrative user 30 communicates with supply chain management system 20 using a browser 32 that is executed by a computer 34. Similarly, one or more enterprise clients or users 38 are communicatively coupled to supply chain management system 20 directly or through one or more local networks 36. Each administrative user 38 communicates with supply chain management system 20 using a browser 40 that is executed by a computer 42. Administrative users are distinguished from enterprise users in that administrative users have greater privileges to view and modify data in system 20.

Figure 1C:
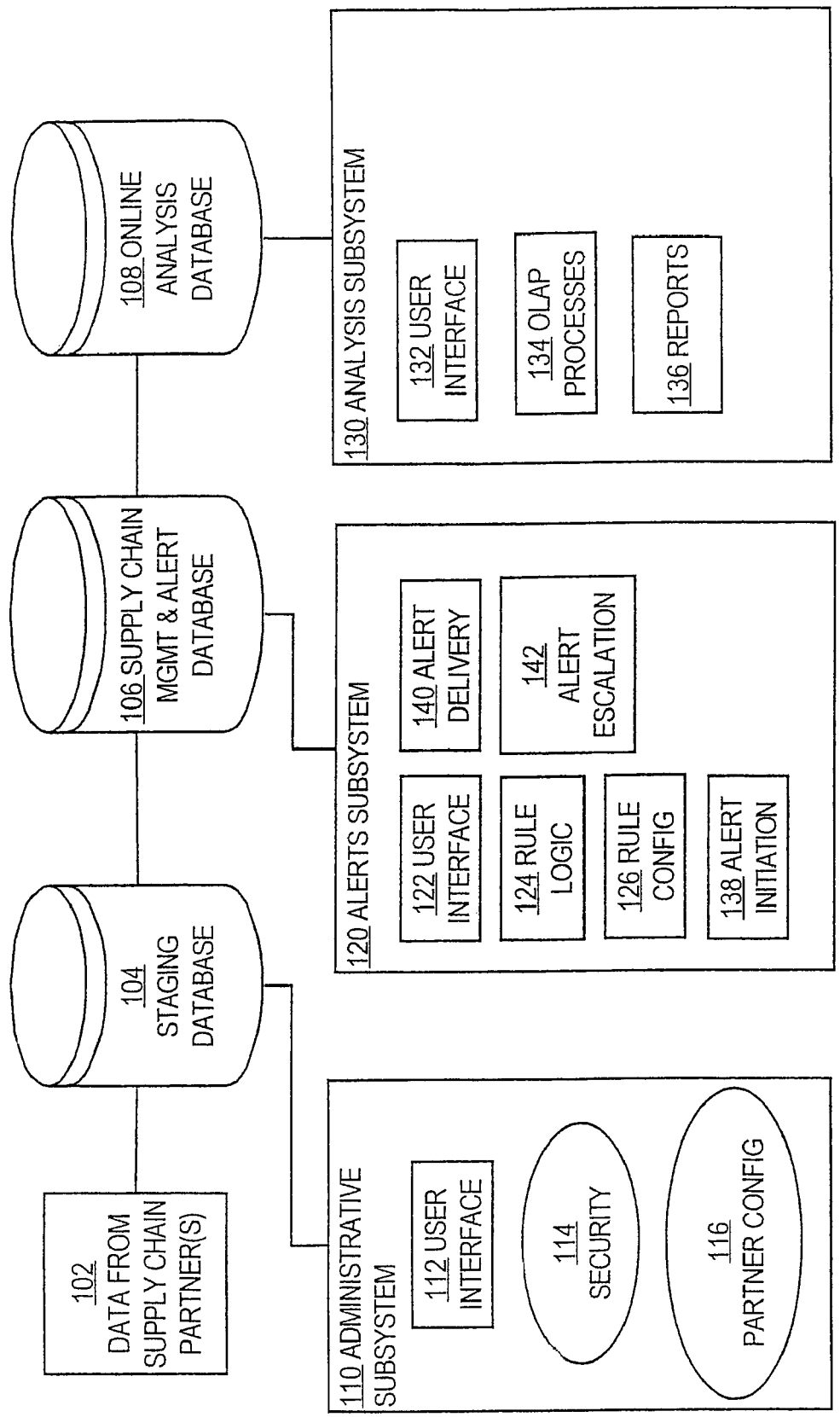
FIG. 1C is a block diagram of a supply chain management system.

FIG. 1C is a block diagram of a supply chain management system. Data from one or more supply chain partners of enterprise 4, represented by block 102, is initially received and stored in a staging database 104. After certain processing as described further herein, a portion of the supply chain partner data 102 proceeds to a supply chain management alerts database 106 ("Alerts Database 106") and to an online analysis database 108.

In an embodiment, supply chain partner data 102 is formatted as one or more electronic documents that conform to one of the Partner Integration Processes or PIPs as defined by the RosettaNet consortium of information technology companies, which is headquartered in Santa Ana, Calif. In general, RosettaNet PIPs define business processes between supply-chain companies, providing the models and documents for the implementation of standards. In an embodiment as described herein, each PIP defines a type of supply chain electronic document based on Extensible Markup Language (XML). Different PIPs correspond to different kinds of supply chain information. For example, one PIP is used to structure data comprising purchase order information, another PIP is used to convey materials order information, etc. Each PIP has a unique identifying label. Examples of PIPs include:

- EA01—Used for master schedule data.
- EA03—Used for commit data.
- EA06—Used for gross demand data.
- EA07—Used for planned PO data.
- EB01—Used for inventory data.
- EB03—Used for work order data and triggers.
- EC01—Used for purchase order data.
- EC02—Used for blanked purchase order data.
- EC04—Used for sales order data.
- ED01—Used for bill of materials data.
- ED03—Used for parts master and approved vendor list data.
- ED04—Used for parts master data.

In one example embodiment, staging database 104 is a relational database system, e.g., Oracle, Sybase, etc.; Alerts Database 106 is a component of the NetWORKS ExchangeWorks Material software product of Manugistics, Inc.; and online analysis database 108 is a component of the ONEview OLAP software system of Manugistics.

An administrative subsystem 110 interacts with staging database 104 to transform the supply chain partner data 102 into validated data that is suitable for use in supply chain management. Administrative subsystem 110 has a user interface 112 that can interact with one or more administrative users through visual means, such as graphical display terminals. A security mechanism 114 manages addition and authentication of users.

A partner configuration mechanism 116 enables an administrative user to define supply chain partners in the system and configure its operations to be compatible with new partners. Partner configuration mechanism 116 includes means for creating and storing various kinds of Partner data. For example, each partner may be designated by a Short Name, e.g., a 10-character name for a partner that may be an abbreviation of the full name of the partner. This short name is used in summary alert displays and reports as appropriate. Partner configuration mechanism 116 also includes means for adding partners to the supply chain management database 106 with a flag that indicates that they are part of the system. There may be un-flagged partners who are in the database but do not participate in system 20.

An alerts subsystem 120 interacts with Alerts Database 106 to generate and track alert messages when violations of pre-defined supply chain management rules occur. A user interface 122 enables one or more users to view alert messages, obtain more detailed information about alerts and underlying electronic documents that resulted in the alerts ("drilling down"), establish and modify rules that result in alerts, etc.

Rule logic 124 provides a means for determining whether one or more stored rules are satisfied by information in Alerts Database 106. If a rule is satisfied, then an alert message is generated in response to changes in information in Alerts Database 106.

Rule configuration mechanism 126 enables creation and modification of rules that govern alerts. Rules are stored in Alerts Database 106 in association with information about partners or PIPs. Rule configuration is provided using rule configuration mechanism 126 for all appropriate rules for each partner. A partner can only have one rule configuration per rule type.

An alert initiation mechanism 128 is responsible for creating an alert in response to a determination that one or more rules of rule logic 124 are satisfied by current information in Alerts Database 106. When an alert is created, alert delivery mechanism 140 carries out delivery of the alert message through one or more means such as email, pager, or by calling programmatic functions or mechanisms. A user who receives an alert can respond by closing the alert or optionally escalating the alert to another user or responsible individual of a supply chain partner until satisfactory resolution of the alert occurs. Alert escalation mechanism 142 manages communication of escalated alerts to the correct party within a particular supply chain partner. Escalation configuration is part of the rule configuration mechanism 126.

An analysis subsystem 130 facilitates reporting and analysis of actions that have occurred, alerts and general information in Alerts Database 106. Using a user interface 132, users can access online analytical processing functions that are provided by OLAP mechanism 134, and reports that are generated by report mechanism 136.

Using this structure, an integrated supply chain management system is provided that effectively identifies, communicates and tracks responses to exceptional events. In general, the disclosed system provides a way to alert a user community to critical business information and business problems within the supply chain and provide a central interface to such information.

Embodiments may be implemented in one or more computer programs or other software elements that are executed by a general-purpose server or other processor, and accessed by users who use general-purpose computers as clients. Such embodiments may be based upon or conform to the Rosetta-Net Implementation Framework, its Dictionaries, and PIPs. In such embodiments, the computer programs or software elements cooperate to carry out the functions described herein. A collection of such software elements operating in cooperation to carry out such functions, organized in the architecture described above and with data stored in the databases described above, is collectively referred to herein as "the system."

2. Functional Overview 2.1 General Process Flow

Figure 2A:
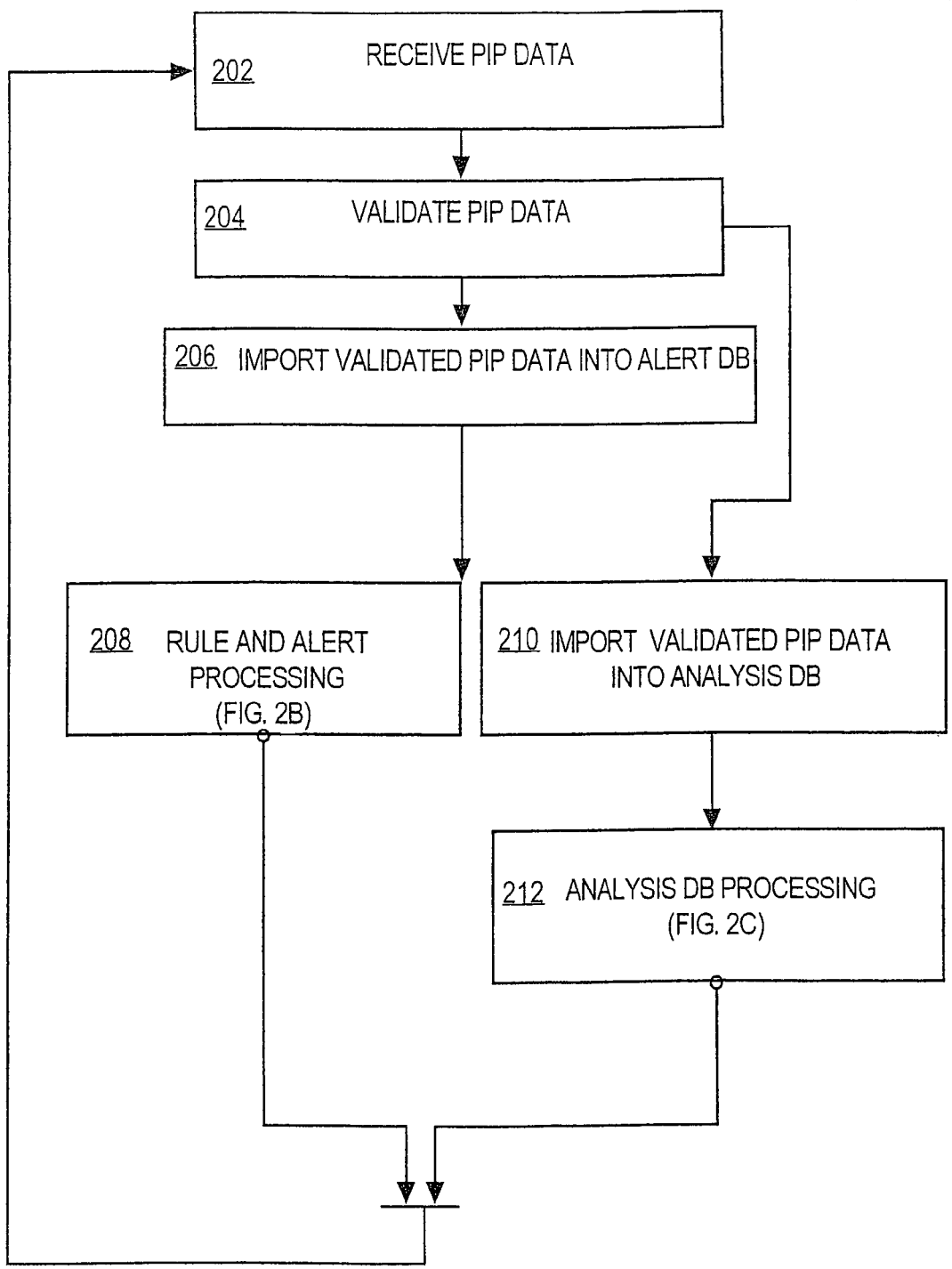
FIG. 2A is a flow diagram of top-level steps involved in an embodiment of processing supply chain information.

FIG. 2A is a flow diagram of top-level steps involved in an embodiment of processing supply chain information. For purposes of illustrating a clear example, the following description will discuss FIG. 2A in connection with the system of FIG. 1C; however, the processes disclosed herein are not limited to the particular system illustrated in FIG. 1C.

In block 202, supply chain partner data 102 is received into Staging Database 104 from one or more supply chain partners. In block 204, the supply chain partner data 102 is validated to ensure that it conforms to correct PIP syntax, to ensure that all values are valid, etc. Validated data is then imported into the Alerts Database 106 from the Staging Database 104, as shown by block 206. In block 208, rule and alert processing is carried out using the data in Alerts Database 106, as described below in connection with FIG. 2B.

In block 210, in parallel with carrying out block 206, data is imported into the Analysis Database 108 from the Staging Database 104 and Alerts Database 106. Analysis database processing occurs using the data, as shown by block 212, and as described below in connection with FIG. 2C.

FIG. 2B is a flow diagram of a process of carrying out rule and alert processing as identified by block 208 of FIG. 2A.

In block 220, a determination is periodically made about whether any rules in Alerts Database 106 are satisfied with respect to any data in the Alerts Database. In one embodiment, according to a periodic schedule, rules for a particular partner or PIP are evaluated. If evaluation of a particular rule indicates that an alert is needed, then an alert is created in memory and evaluated.

In block 222, all alerts currently in existence are evaluated, as detailed in the succeeding steps. In block 224, a test is made to determine whether a particular alert is a new alert. If so, then a persistent entry is created for the alert in an alert table of Alerts Database 106, as indicated by block 226. If the alert already exists, then no action is taken. If the alert has been resolved or repaired, as indicated by information in Alerts Database 206, then the alert is removed from the alert table.

Processes for notification and escalation of alerts, as represented by block 230, are configured to run on a periodic basis. In block 232, the process determines whether there are any new alerts that have not been sent out to the appropriate recipient. If so, then they are sent at this time. Notifications are consolidated or ordered by rule for a particular recipient, as indicated by block 234. Thus, in a message sent to a particular recipient, all related alerts are grouped together. Block 236 represents the step of sending alerts to a recipient using an email message, pager message, other communication mechanism, or by calling a programmatic method to communicate alert data to an application program.

Figure 2C:
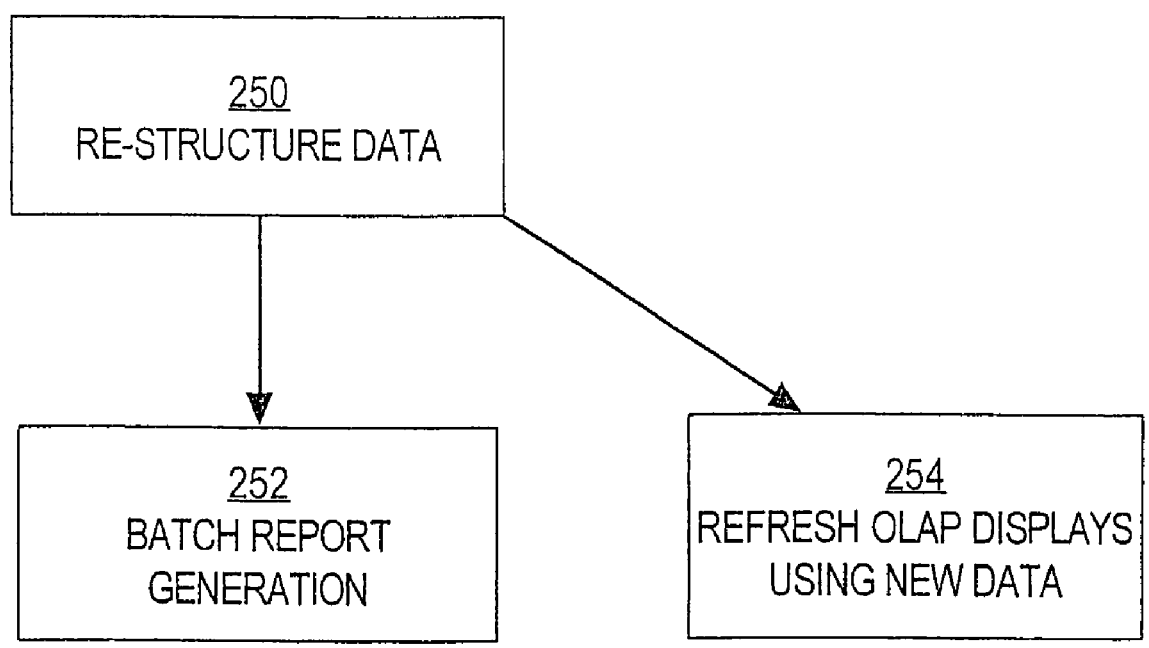
FIG. 2C is a flow diagram of a process of carrying out analysis database processing.

FIG. 2C is a flow diagram of a process of carrying out analysis database processing, as illustrated by FIG. 2A, block 212.

In block 250, data in Analysis Database 108 is re-structured as necessary to support report generation and online analysis. For example, in one embodiment, data in Analysis Database 108 is transformed into Data Mart format, which provides structuring necessary for subsequent analysis and processing by the One View database. In block 252, one or more batch reports are generated. Optionally, report generation may include display at a user display terminal. In block 254, one or more OLAP objects or displays, which have been previously created and saved by a user, are updated or "refreshed" using the re-structured data. Such refreshing ensures that the OLAP objects or displays accurately reflect newly imported data.

2.2 Information Delivery

Modes of information delivery offered by the system and processes described herein include alerts, on-demand reports, and advanced analysis data. As described further in succeeding sections, delivery of alerts includes providing a summary display of alerts, detailed access to alerts, and detailed views that provide supporting information about particular alerts ("drill downs").

Delivery of on-demand reports includes providing on-demand report data that is accessed and displayed using a standard browser program through one of the user interfaces 112, 122, 132. Delivery of reports may also include exporting report data to a formatted file (e.g., a file of comma-separated values), or a printable version.

Delivery of advanced analysis data includes providing batch OLAP reports, the ability to enter queries and receive responses, and other advanced analysis functions. In an embodiment, these advanced analysis functions are available to all supply chain partners; alternatively, they may be restricted to the core enterprise, e.g., enterprise 4 of FIG. 1A.

2.3 User Interface

In one embodiment, access to alert information is provided through a graphical user interface that interacts with a browser client program through standard HTML code. To interact with the system, a user directs a browser or other client to a pre-defined Universal Resource Locator (URL) that identifies a startup page or script of the system 20. In response, the system 20 delivers one or more pages comprising the user interface to the client.

Figure 3A:
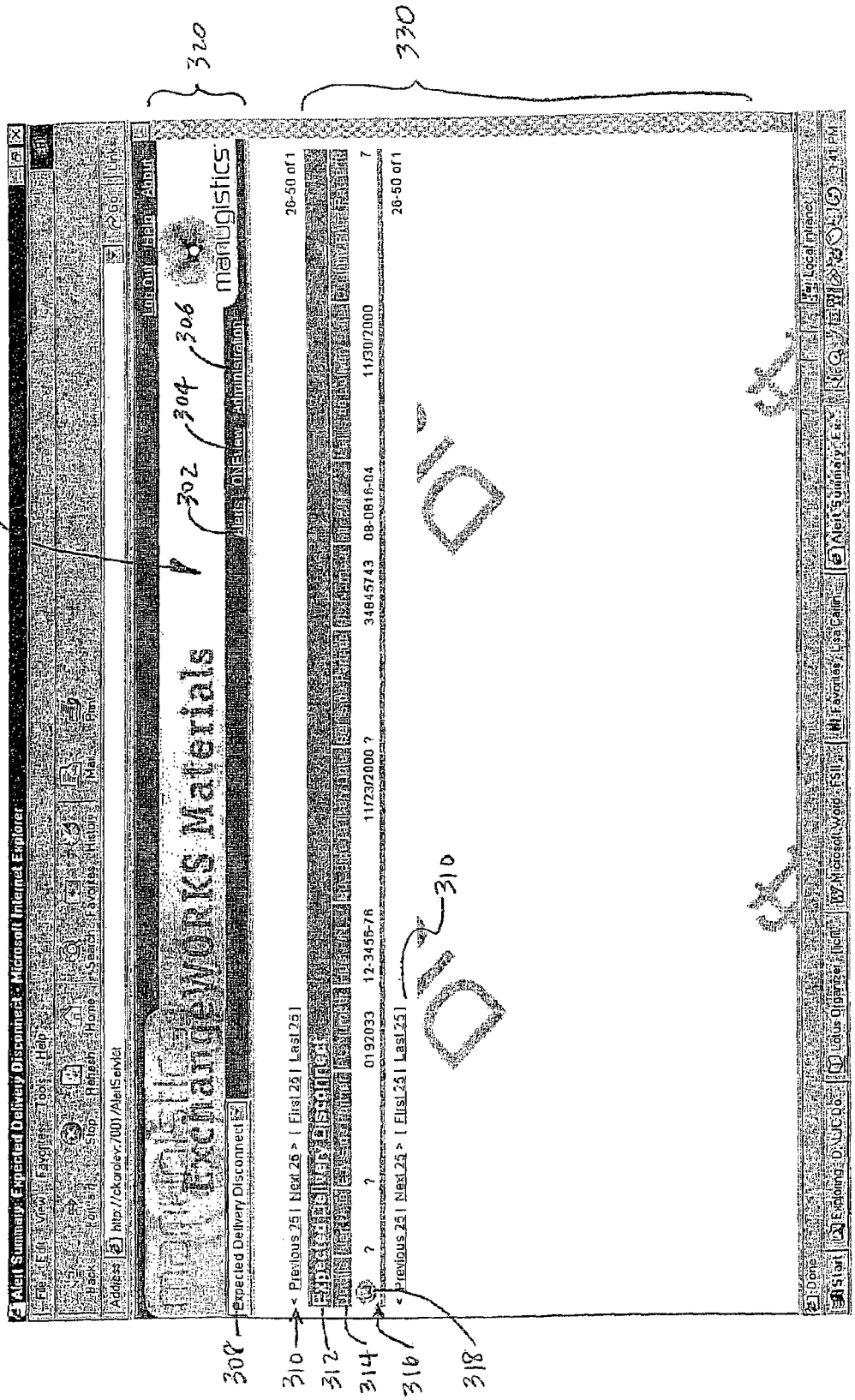
FIG. 3A is a diagram of a screen display that provides an example of a suitable system user interface.

FIG. 3A is a diagram of a screen display that provides an example of a suitable system user interface. Screen display 300 generally comprises a function selection pane 320 and a display pane 330. Function selection pane 320 includes an Alerts button 302, Analysis button 304, and Administration button 306. In one embodiment, screen display 300 is implemented as an HTML page that is displayed by a Web browser, and Alerts button 302, Analysis button 304, and Administration button 306 are selectable hyperlinks. Selecting Alerts button 302 causes the system to generate an alerts display of the type shown in FIG. 3A. Selecting Analysis button 304 causes the system to generate a different display that provides access to OLAP functions, batch reporting, etc.

Selecting Administration button 306 causes the system to generate a display that provides access to administrative functions. In an embodiment, the administration user interfaces provides access to functions for the configuration of rules, escalation, approved vendor list and other system settings.

Display pane 330 includes a rule pull-down menu 308, navigation links 310, alert title bar 312, field headings 314, and alert data 316. The user interface provides access to alerts by rule type, so that in one embodiment, all alerts that are triggered by a particular type of rule are grouped together. A user views alerts corresponding to a particular rule by selecting the rule of interest from rule pull-down menu 308. In a large enterprise that has a large number of supply chain partners, there may be numerous users, each of which is responsible for a selected sub-group of the supply chain partners. In this arrangement, each user accesses alerts based on the supply chain partner and part numbers for which that user has responsibility.

If there are a large number of alerts for a particular rule, then the system displays the first 25 alerts, and the user may view other alerts by selecting one of the navigation links 310. Although specific navigation links are shown in FIG. 3A for the purpose of illustrating a simple example, e.g., "Previous 25," "Next 25," "First 25," "Last 25," no particular navigation links are required, and different such links may be provided in other embodiments.

Alert title bar 312 identifies the name alerts that are displayed in the screen display. The name of the alert in the title bar 312 is one of the rules specified in Table 1 herein. Field headings 314 identify the type of data that is displayed in tabular format as alert data 316 in successive lines within display pane 330. A user can sort information in alert data 316 one column at a time in ascending or descending order by selecting one of the field headings 314. In response to such selection, the system sorts the data using the selected field heading as a key, generates an updated screen display based on the sort, and provides the updated display to the browser.

When a user first connects to the system, the initial view is a summary of all alerts for rules for the user, as shown in FIG. 3A. The system presents a summary view of alerts by rule type. Also, an email is sent to the user for each rule and contains summary information. The purpose of the summary view and the email summary is to provide enough information to enable the user to prioritize and select what the user wants to work on next. Users can then work exclusively in a separate ERP system if desired, or can access the system disclosed herein through a URL for more information.

Figure 3B:
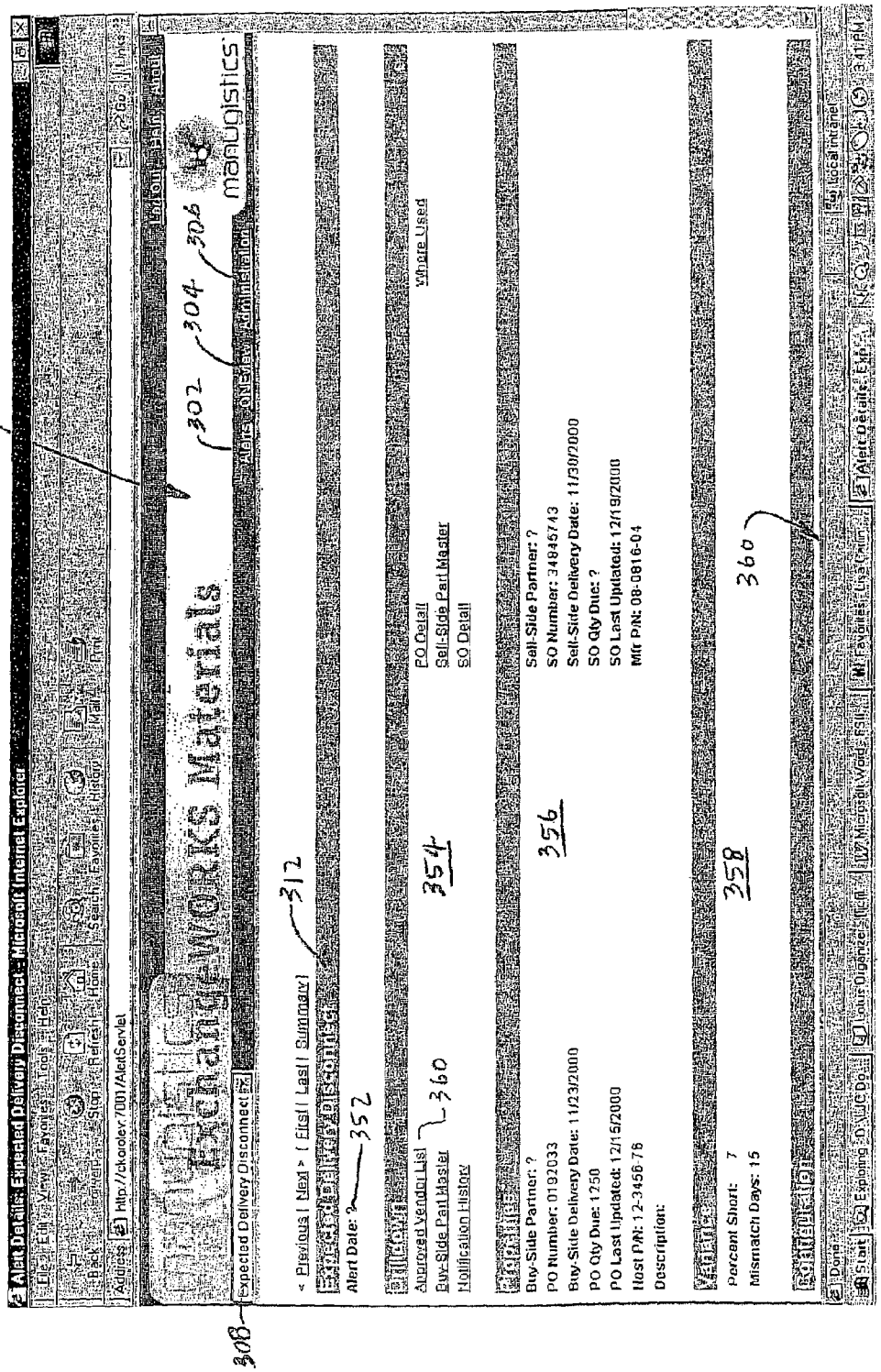
FIG. 3B is a diagram of a screen display that provides a detailed view of the information shown in FIG. 3A.

FIG. 3B is a diagram of a screen display that provides a detailed view of the information shown in FIG. 3A. Screen display 350 of FIG. 3B is obtained by selecting a detail view link 316 in screen display 300 of FIG. 3A. Using screen display 350, a user can view more detailed information about an individual alert. Screen display 350 generally comprises the alert title bar 312, a drilldown link pane 354, a Properties pane 356, Variance pane 358, and Configuration pane 360.

Alert title bar 312 presents the name of the current type of alerts that is displayed, as in FIG. 3A. Properties pane 356 presents values for specific properties of the alert, and the values correspond to those displayed in alert data 316 under field headings 314 in screen display 300 of FIG. 3A. Variance pane 358 presents information about the number of times similar alerts have occurred for the same supply chain partner. Configuration pane 360 presents information about variance configuration parameters (i.e. what percent variance constitutes an exception condition), and who has been configured to receive notification. Drilldown link pane 354 presents one or more links, selection of which causes the system to display even further detailed information relating to the alert. Typically the information accessible using links in drilldown link pane 354 is supporting information rather than details of an alert. Further, the specific drilldown links that are provided in pane 354 are selected and displayed by the system based on the current rule type. Thus, different drilldown link displays are provided in pane 354 according to the nature of the rule type shown in title bar 312, and only the drilldowns that are specifically associated with a particular rule are have links displayed in pane 354.

Table 1 presents a list of all available drill down views that can be potentially presented for rules. The section below entitled RULE LOGIC identifies the specific subset of drilldown views that are available for particular alerts.

TABLE 1

AVAILABLE DRILL-DOWN VIEWS

Approved Vendor List - List of vendors who also supply a particular item.
Buy-Side Part Master - List of attributes from Buyer's Part Master.
Demand Pegging - List of forecast level demand items and their associated demand for the specified date, based on forecasts of the core enterprise (e.g., enterprise 4 of FIG. 1A).
Excess Available - List of Partners that have excess inventory available for a particular item part number. Information includes a supply chain partner name and e-mail address; the e-mail address is linked to launch a pre-configured e-mail application so that requests to purchase excess may be made rapidly.
Forecast Profile - Similar to Supply/Demand Profile; provides a grid of data that represents Top Level Demand numbers over time, MPS Load numbers, the cumulative of each and the rolling delta between the two. In an embodiment, periods that exceed the configured thresholds are highlighted.
Forecast Waterfall - A data display that provides the Oldest Baseline Forecast at top with current forecast on bottom. Each baseline version is indicated. Purchase Order Receipt data is incorporated as Actual Consumption. Totals are calculated for a TABLE 1-continued

AVAILABLE DRILL-DOWN VIEWS

Forecast Date, Forecast Variability, Actual Consumption, and Cumulative Delta for each Baseline. Forecast Variability is defined as Max(Demand) - Min(Demand)/Min(Demand) for a given week.
Forecast Waterfall with Time Fence Profile - Data display that includes an Oldest Baseline Forecast at top with current forecast on bottom. Time Fence Profile incorporated based on lags. Each baseline version is indicated. Purchase Order Receipt data is incorporated as Actual Consumption. Totals are calculated for a MPS Date, Forecast Variability, Actual Consumption, and Cumulative Delta for each Baseline.
Notification History - List of who has been notified of the associated alert, a date and time value indicating when it was sent and at what escalation level (1, 2, or 3). A link is provided to allow the user to manually escalate the alert to the next level. If manual escalation is used, it is noted in the notification history.
Purchase Order Detail - with Line Item Detail (Line Number, Part Number, Revision, Quantity, Balance Due, Required Date, Delivery Date, Status) and Receipt Detail (Line Number, Delivery Date, Required Quantity, Received Quantity, Remaining Quantity, Received Date)
Sell-Side Part Master - List of attributes from Seller's Part Master.
Shipment Order Detail - Provides detail information with Line Item (Line Number, Manufacturer Part Number, Rev, Quantity, Balance Due, Requested Delivery Date, Current Delivery Date, Current Ship Date, Status) and Shipment Detail (Line Number, Required Quantity, Shipped Quantity, Remaining Quantity, Shipment Identifier, Carrier, Tracking Id)
Supply/Demand Profile - Provides a grid of data similar to Aggregated Net Demand Report that represents the Demand numbers over time, Supply numbers, the cumulative of each and the rolling delta between the two. The periods that exceed the configured thresholds are highlighted.
Supply Detail - provides a breakdown of Supply components found in the Supply PIP, including On Hand and On Order components.
Where Used - List of all part numbers that are used within the referenced parts Bill of Material (BOM). If a part number is not a top-level part, then it is linked to additional parts within the BOM. This will continue until all part numbers are completely expanded.

2.4 Rules and Alerts; Rule Configuration and Processing

Rules are scheduled to run on a periodic basis by partner for a particular rule. Alerts are the result set of a given rule, and may comprise Data Alerts and Scheduled Alerts.

In one embodiment, the rules set forth in Table 1 are defined and processed.

TABLE 1

EXAMPLES OF RULES

Expected Delivery Disconnect
Unplaced PO
Late PO Receipt
Late Sales Order Shipment
Late Trigger Start
Supply/Demand Disconnect
MRP Profile (Dashboard)
Baseline Forecast Disconnect
Forecast Time Fence Disconnect
Lead Time Disconnect
Sales Order Change
Top Level Demand Disconnect
Lead Time/Delivery Date Disconnect
Summary Bill of Material Disconnect Referring again to FIG. 1C, Rule Configuration mechanism 126 provides a way to create, modify and delete one or more rules that determine whether alerts are triggered. In an embodiment, separate rules are created, stored, and configured for each supply chain partner ("partner"). A partner need not be configured for every rule.

In one embodiment, rule configuration is carried out by direct access to Alerts Database 106. In an alternative embodiment, a partner connects a Web browser to user interface 122 to configure rules.

A rule comprises one or more properties that specify the criteria and threshold values for the rule. A rule includes one or more escalation properties that specify, for each partner, a role that should receive alerts and after what period of time (i.e. initial, 24 hours, one week, etc.). In an embodiment, a user must have administration privileges in order to configure the escalation or notification levels for the partner with which the user is associated. When enterprise 4 is specified as the third party participant in a transaction, the role specified indicates the role found on the related forecasted part number(s). The original alert may be associated with a lower level part number or an assembly, etc. The role specified for the associated forecasted part number(s) is notified. For partners in general, and for enterprise 4 when it is the Buy-Side participant in a transaction, the role specified indicates the role found on the part number of the alert.

In operation, when rules are configured, Rule Logic mechanism 124 determines whether rules are satisfied. Rule Logic mechanism 124 communicates with Rule Configuration mechanism 126 to determine tolerance values for satisfying a rule. Rule Logic mechanism 124 checks all data in the Alerts Database 106 to identify any condition that should result in an alert. Any alerts that are detected are stored in the database for further processing.

In an embodiment, when each rule is run, Rule Logic mechanism 124 evaluates whether a new alert is to be generated or an existing alert needs to be cleared. When alerts are cleared or refreshed, as in block 254, they are archived and transferred to the Analysis Database 108. A detailed description of how rules are processed by Rule Logic mechanism 124 is given herein in Section 3.

2.5 Alert Escalation

Alert escalation logic 142 is configured to automatically escalate alerts. In this context, "escalation" refers to sending information about an alert to individuals having an increasingly high level of authority or responsibility over a period of time, until the alert is resolved.

In one embodiment, based on pre-defined alert escalation configuration information, alert escalation logic 142 moves an alert through one or more defined alert escalation states. The escalation configuration may define up to three states within each partner or perspective. A transition to a new escalation state is based on the amount of time that has elapsed since detection of the alert. Each partner involved may define its own escalation path.

In addition, a user can manually escalate an alert. In one embodiment, to manually escalate an alert, the user starts at the alert details view and selects the Notification History drill down, and the user then selects the "Manually Escalate" button on the user interface. The alert is then escalated to the next level. Future escalations will follow the normal escalation path/timing based on the original alert.

2.6 Alert Delivery

Once an alert enters a state at which a user is required to be notified, the Notification component is responsible for alert delivery. Any computer-based, automated delivery mechanism may be used, e.g., email, pager, voice call, etc. The alert notification process scans the alert tables and consolidates alerts to be sent to the appropriate recipients. The alerts are consolidated by user for a particular rule.

When alert delivery is carried out by email, the alert e-mail includes summary information about the alert of the same kind that is accessible in the user interface. The email alert also contains a URL that directs the user back to the summary data for the associated rule type so that detailed information may be obtained.

2.7 Sources of Data from Partners

Referring again to FIG. 1B and FIG. 1C, supply chain management system 20 may receive source data for its databases and for generating alerts and reports from any of the partners 24A, 24B, etc. FIG. 4, FIG. 5, FIG. 6, and FIG. 7 are block diagrams illustrating electronic documents that are generated in planning, procurement, for products, and for production, showing the information that partners provide to the system.

Referring first to FIG. 4, it is a block diagram of a process of providing planning information to a supply chain management system. In the planning process of FIG. 4, participating partners include an end user 404, contract manufacturer 406, and distributor 408. In one embodiment, end user 404 is the same as enterprise 4; CM 406 makes and delivers finished products or assemblies to end user 404; and CM 406 receives parts and materials from distributor 408 for use in manufacturing or assembly. Although FIG. 4 shows only one distributor 408, CM 406 may interact with any number of distributors according to its needs for different parts. Supply chain management system 20 receives data in the form of electronic documents from CM 406 and distributor 408.

The planning process generally begins when CM 406 issues a commit 410 indicating that it is planning to produce a particular product. At commit time, CM 406 issues a PIP EA03 412 to system 20. At about the same time, end user 404 undertakes a manufacturing resource planning (MRP) process 414 in order to determine its requirements for products, resulting in generation of a forecast 416 for its needs, which is communicated to CM 406. Upon receipt of the forecast 416, CM 406 subjects the forecast to analysis 418, resulting in generation of a master schedule 420. The master schedule 420 is communicated to system 20 as PIP EA01, and is provided as input to an MRP system or process 422 of CM 406.

As a result, CM 406 determines the gross demand 424 for the product in units or some other quantity. The gross demand 424 is communicated to system 20 as EA06, thereby enabling enterprise 4 to know what number of units CM 406 is anticipating making. If CM 406 already has an inventory of such product, then the CM does not need to make new product in a quantity equal to the entire gross demand. Accordingly, inventory data 426 is compared to gross demand 424 to arrive at a net quantity value 428 that represents the number of units that CM 406 actually needs to make in order to meet anticipated demand. Based on the net value, CM 406 generates one or more planned PO's 430 that are communicated to end user 404 and system 20 as PIP EA07.

Based on the planned PO's 430, CM 406 selects one or more distributors that can supply parts or materials that the CM needs to carry out its manufacturing work. Assume that distributor 408 is one distributor that is selected, and supplies one kind of component to CM 406. To obtain needed components, CM 406 generates a PO 432 that is communicated to distributor 408. In response, distributor 408 internally generates a sales order 434 that confirms the PO and represents a sale of components to CM 406. Based on SO 434 and any other related SO's, distributor 408 generates a master schedule 436 that states what components the distributor plans to deliver and when, among other information. Master schedule 436 is communicated to end user 404 and system 20 as PIP EA01.

Thus, end user 404 and system 20 acquire information showing not only what its direct contractor (CM 406) is planning to produce and deliver, but also what all downstream component distributors are planning to deliver up the supply chain. Unlike past approaches, in this approach end user 404 and system 20 acquire information needed to determine when problems far down the supply chain, e.g., at distributor 408, may disrupt the production or delivery schedules of CM 406 or end user 404.

Master schedule 436 of distributor 408 is provided as input to an MRP system or process 438 of distributor 408. As a result, distributor 408 determines the gross demand 440 for the ordered component. The gross demand 440 is communicated to system 20 as EA06, thereby enabling enterprise 4 to know what number of components distributor 408 is anticipating making or obtaining from a downstream supplier. If distributor 408 already has an inventory of such product, then the distributor does not need to make new product in a quantity equal to the entire gross demand. Accordingly, inventory data 444 is compared to gross demand 440 to arrive at a net quantity value 442 that represents the number of units that distributor 408 actually needs to make in order to meet anticipated demand. Based on the net value, distributor 408 generates one or more planned PO's 446 and issues them to one or more downstream component suppliers or other partners. The planned PO's 446 also are communicated to end user 404 and system 20 as PIP EA07.

Figure 5:
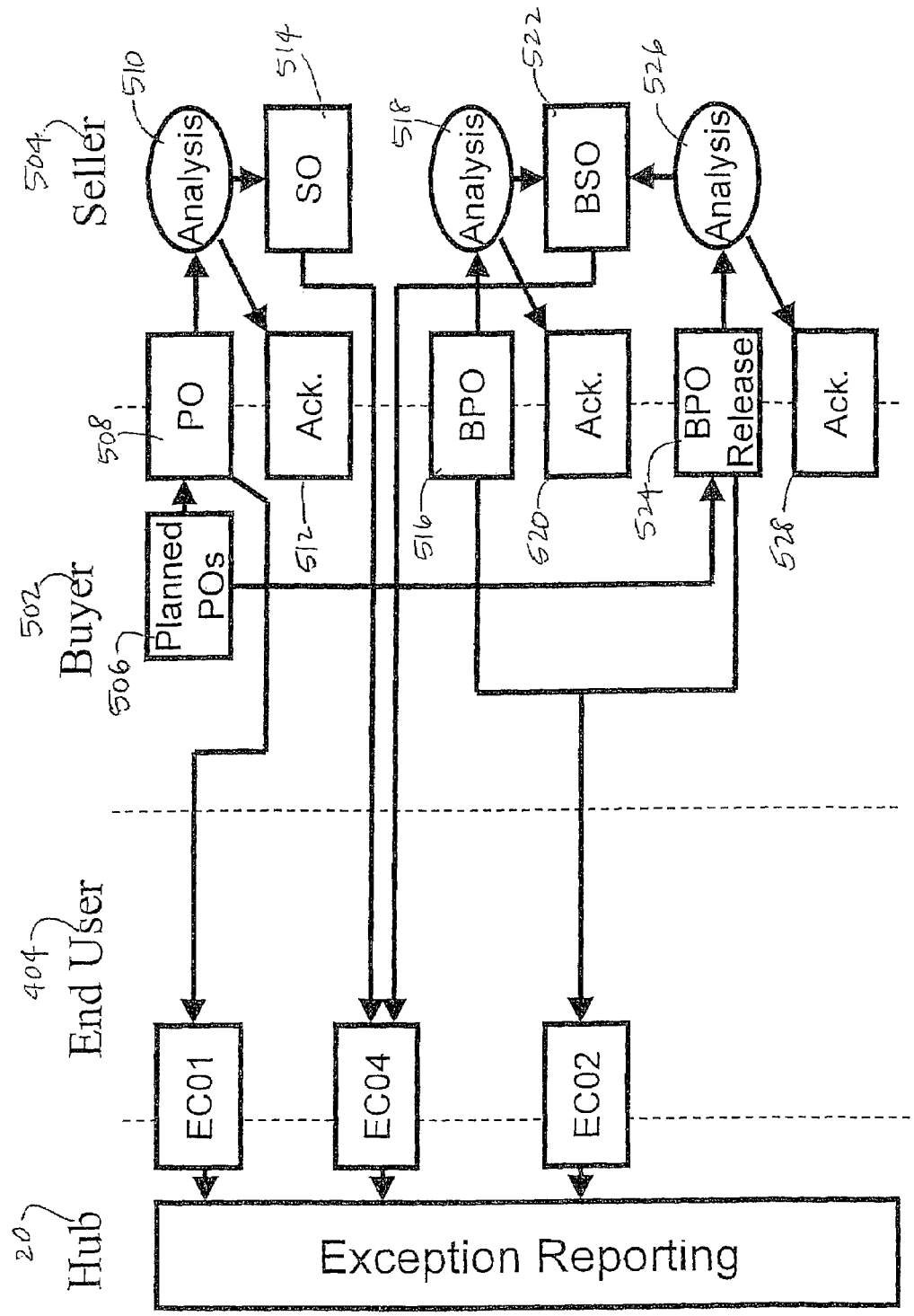
FIG. 5 is a block diagram of a process of providing procurement process information to a supply chain management system.

FIG. 5 is a block diagram of a process of providing procurement process information to a supply chain management system. The process of FIG. 5 may be used in any buy-sell transaction between any pair of partners.

A partner acting as Buyer 502 creates or has on hand one or more planned PO's 506. For example, planned PO's 506 may correspond to planned PO's 430 or planned PO's 446 of FIG. 4. From among planned PO's 506, Buyer 502 selects Seller 504 to supply a particular component to the Buyer. Accordingly, Buyer 502 generates a PO 508 for Seller 504 for a particular component. PO 508 is communicated to end user 404 and system 20 as PIP EC01, and is also communicated to Seller 504. In response, Seller 504 subjects PO 508 to analysis, as indicated by block 510, and then generates an acknowledgment 512 to Buyer 502 and an internal sales order 514. The SO 514 is communicated to end user 404 and system 20 as PIP EC04.

Additionally or alternatively, Buyer 502 may generate a blanket purchase order 516, which is communicated to Seller 504 and to system 20 as PIP EC02. Seller 504 subjects the blanket purchase order 516 to analysis 518 and then generates and sends an acknowledgment 520 to Buyer 502. Further, Seller 504 generates a blanket sales order 522 in confirmation of the blanket purchase order, which is communicated to end user 404 and system 20 as PIP EC04. When a blanket purchase order is in the system, a Buyer 502 may obtain components based on one or more planned PO's 506 by converting one of the planned PO's into a BPO release 524. Thus, use of a BPO release represents an alternative to proceeding from a planned PO 506 to a PO 508. When a BPO release occurs, it is communicated to end user 404 and system 20 as PIP EC02, and to Seller 504. In response, Seller 504 carries out analysis 526 and generates an acknowledgment 528. Seller 504 may also issue a new BSO 522.

Figure 6:
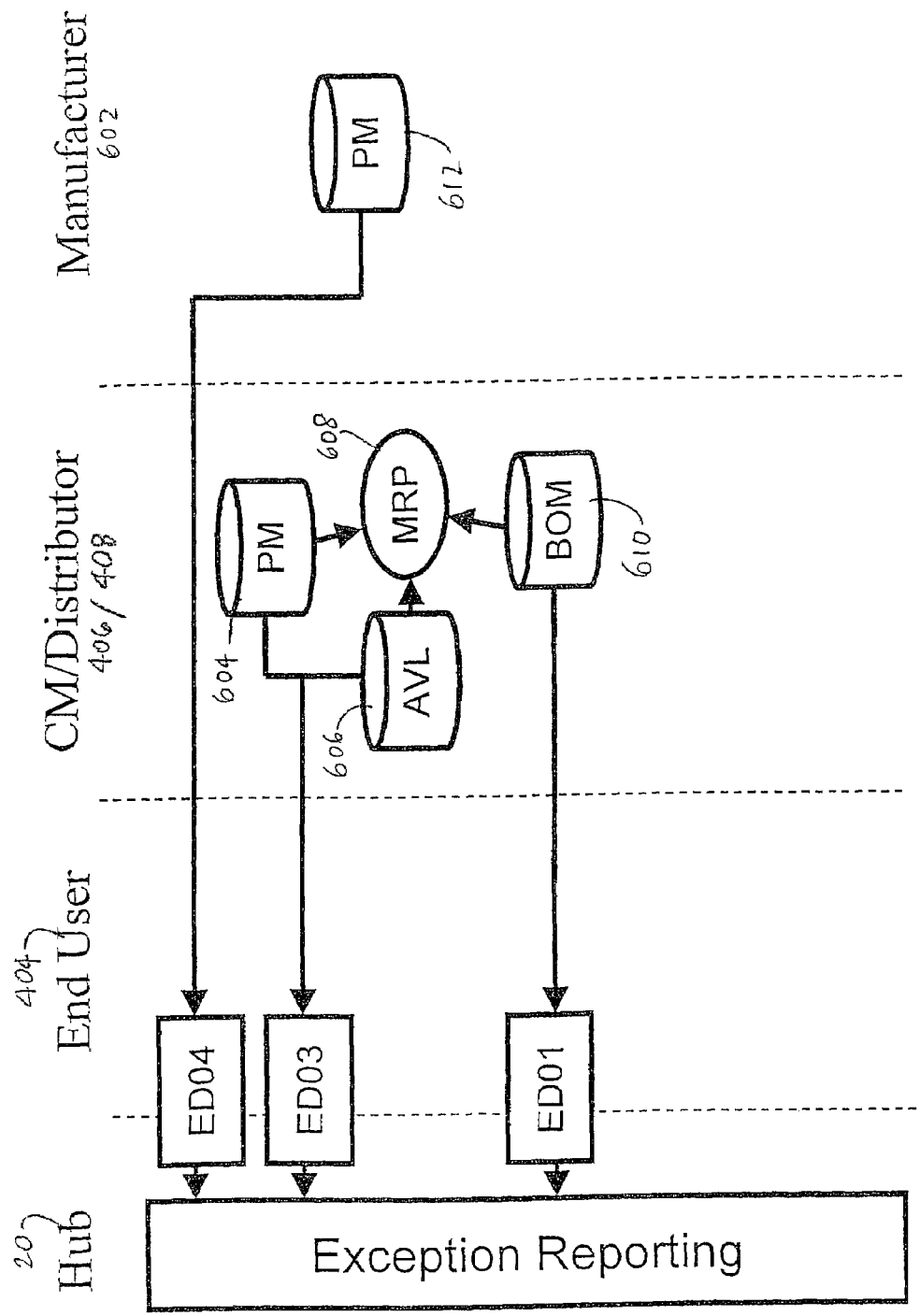
FIG. 6 is a block diagram of a process of providing product information to a supply chain management system.

FIG. 6 is a block diagram of a process of providing product information to a supply chain management system. A supply chain partner who is a manufacturer 602 provides parts master data 612 to end user 404 and system 20 as a PIP ED04. A partner who is a contract manufacturer 406 or distributor 408 may have parts master data 604, approved vendor list data 606, and bill of material data 610, all of which interact with an MRP system 608 of the manufacturer or distributor. Parts master data 604 is reference data on all parts, components or assemblies that are deliverable from the manufacturer or distributor, and is provided to end user 404 and hub 20 using PIP ED03. Approved vendor list data 606 identifies which third party vendors are approved to provide parts, components or assemblies and is provided using PIP ED03. BOM data 610 identifies what sub-components make up each part, component or assembly of the manufacturer or distributor, and are provided using PIP ED01.

Thus, end user 404 and system 20 acquire detailed information about all parts available from all supply chain partners, including based identification information, approved vendors, and sub-components. As a result, end user 404 and system 20 can determine when shortages or disconnects in the supply chain may affect the ability of a supply chain partner to deliver. End user 404 and system 20 also can identify alternative sources of supply for the same part, component, assembly or sub-component and issue appropriate orders or requests.

Figure 7:
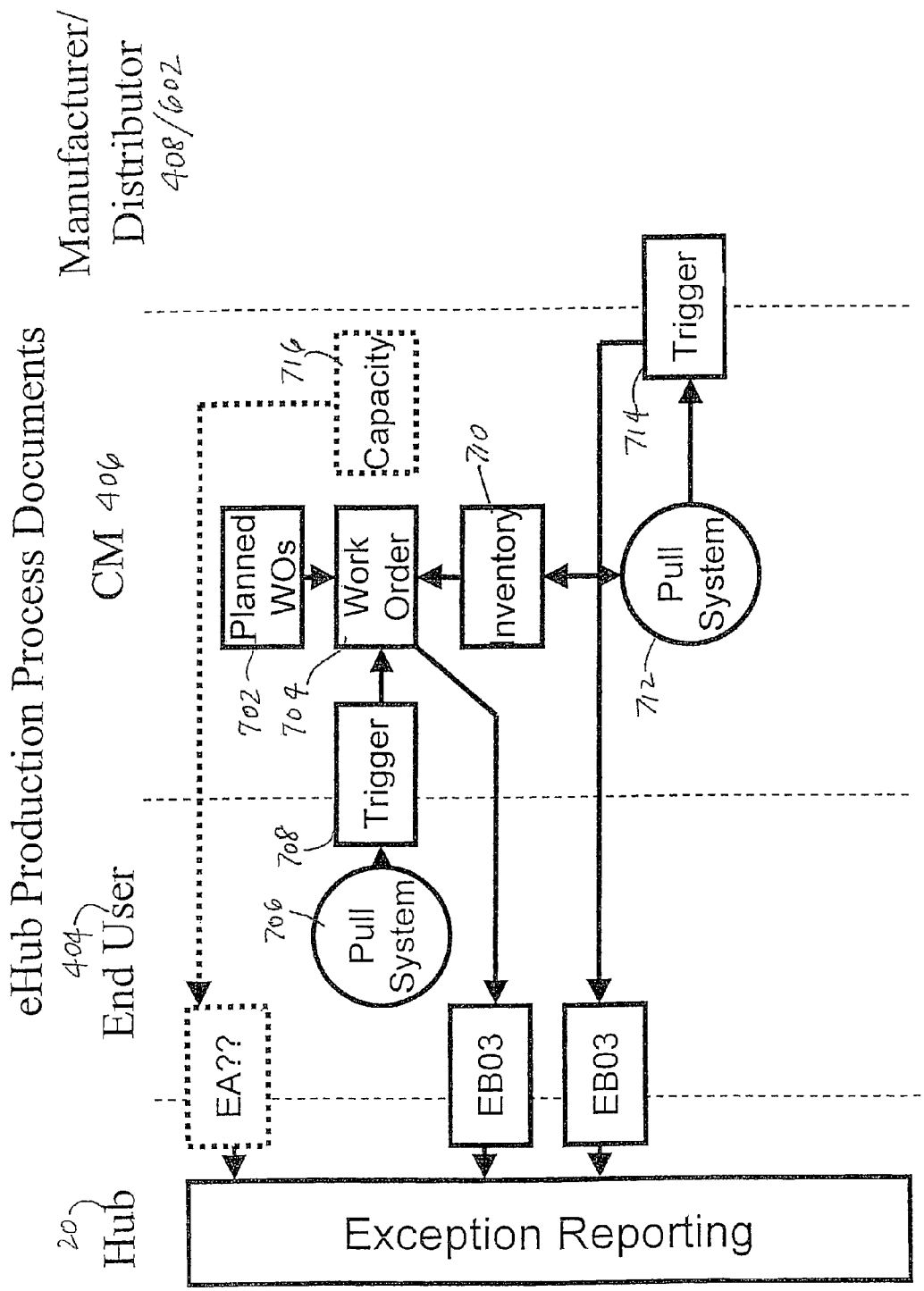
FIG. 7 is a block diagram of a process of providing production process information to a supply chain management system.

FIG. 7 is a block diagram of a process of providing production process information to a supply chain management system. In general, a contract manufacturer 406 has on hand or generates one or more planned WO's 702 representing anticipated manufacturing work to make components for inventory. Based on the planned WO's 702, CM 406 creates one or more actual work orders 704 that instruct its personnel or its sub-contractors to make components. Information about the inventory 710 of the CM 406 may be received to determine how many work orders are needed and what they should cover. Work orders are communicated to end user 404 and system 20 as PIP EB03.

Alternatively, a work order 704 may be generated by a pull system 706 of the end user 404 that issues a trigger 708 to the CM 406. In this alternative, a software system of the end user 404 essentially orders the CM 406 to make a particular component in a particular quantity. This action is appropriate, for example, where end user 404 needs an immediate delivery of a particular component, or becomes aware of a disconnect at some point in the production process.

Further, inventory information 710 and work orders 704 may be generated by a pull system 712 of the CM 406 in response to a trigger 714. [Please elaborate on when and why this is done.] Trigger 714 is communicated to end user 404 and system 20 as a PIP EB03.

In another embodiment, or optionally, capacity information 716 is communicated from CM 406 to end user 404 and system 20. Capacity information 716 represents the total manufacturing capacity of the CM 406 for a particular component. Having capacity information 716 is useful to end user 404 in determining whether to issue a trigger 708, in determining whether to select CM 406 or turn to another CM for a particular component, etc.

2.8 On-Demand Reports

Report mechanism 136 is configured to generate one or more reports on demand in response to selection of criteria or in response to receiving user input. In one embodiment, the available on-demand reports include an Aggregate Net Demand report, Allocated Part Supply/Demand report, Supply Commit report, Supply Split report, and Potential Excess & Obsolete report.

2.9 Security

According to an embodiment, User and Role configuration is provided in an LDAP Profile of a directory server that is associated with the system. Values that can be configured include Company, Userid/e-mail, and Role—Admin and User. The Web server 160 provides authentication.

A user who has the "Admin" role is allowed administrative access to Rule Configuration and Partner information for the Partner this user belongs to. If the Partner is the enterprise 4, then the user has access to additional functionality such as running the import, etc. A user who has the "User" role is allowed access to Alerts and On-Demand Reports through the user interface 122 for the Alerts that have been sent to this user and/or the Report data for this Partner. If the user is a user employed by or otherwise closely associated with enterprise 4, then the user has access to alerts they have been sent on behalf of their partners.

3.0 Rule Logic

In the following section, a summary of logical actions taken by rule logic 124 is presented, for each rule that is recognized in the system, according to one example embodiment. For clarity and brevity, rule logic is presented in the form of a table. For each rule, the table has rows entitled Rule Processing, Data Dependencies, Rule Properties, Escalation Properties, Alert Summary Display, and Drill Downs, if applicable.

The Rule Processing row gives the specific logical steps that are carried out by a particular rule. The Data Dependencies row indicates what data is required to be received or stored before a rule is executed, if proper results are desired. The Rule Properties row indicates what attribute values are required to evaluate the rule. The Escalation Properties row identifies the number of escalation levels and the parties who participate in escalation of an alert related to the rule. The Alert Summary Display row indicates the data values that are presented in a summary view of alert information, and the Alert Detail Display indicates data values that are presented in a detailed view of the alert. The Drill Downs row identifies one or more additional, detailed views that are available to obtain further information about an alert. The Resolution row specifies what conditions must be satisfied for an alert to achieve resolution.

3.1 Expected Delivery Disconnect Rule

An Expected Delivery Disconnect rule is provided to identify differences between the Buy-Side Partner's PO delivery date and quantity and the Sell-Side Partner's Sales Order delivery date and quantity.

| | |
|---|---|
| Rule Processing | Compare PO Current Delivery Date and Requested Quantity and Sales Order Delivery Date and Quantity between two Partners for each Line Item on a PO for each P/N. If the difference between the two Dates exceeds the configured "Days Late" or "Days Early", then an alert is generated. If the difference between the PO Quantity and Sales Order Quantity exceeds the configured "Quantity Short Percent", then an alert is generated. If the Sell-Side Partner is enrolled as a Partner, but a Sales Order isn't found to match the PO, then an alert is generated. If more than one Sales Order is found to match the PO, then the latest Delivery Date and total quantity by that date are used to determine if an alert is generated. |
| Data Dependency | Rule is configured for the Buy-Side Partner and is run when Sell-Side Partners have submitted their Sales Orders for this Buy-Side Partner. |
| Rule Properties | General Properties: Buy-Side Partner; Quantity Short Percent; Number of Days Late; Number of Days Early. |
| Escalation Properties | Three levels: Age (In Days); Role. Participants include the enterprise, the Buy-Side Partner, and the Sell-Side Partner. |
| Alert Summary Display | Alert Generate Date<br>Buy-Side Partner<br>PO Number<br>Enterprise P/N<br>PO Delivery Date<br>Sell-Side Partner<br>SO Number<br>Mfr P/N. In one embodiment, Mfr P/N may be removed from the summary display depending on space constraints of the view.<br>SO Delivery Date<br>Quantity Short |
| Alert Detail Display | Details:<br>Alert Generate Date<br>Buy-Side Partner<br>Sell-Side Partner<br>Properties:<br>PO Number<br>Enterprise P/N<br>P/N Description<br>PO Delivery Date<br>PO Quantity<br>PO Last Updated in system<br>SO Number<br>Mfr P/N<br>P/N Description<br>SO Delivery Date<br>SO Quantity<br>SO Last Updated in system<br>Variance:<br>Quantity Short<br>Quantity Short Percent<br>Mismatch Days<br>Configuration:<br>Buy-Side Partner<br>Quantity Short Percent<br>Max Days Late<br>Max Days Early |
| Drill Down(s) | Approved Vendor List<br>Buy-Side Part Master<br>Demand Pegging<br>Notification History<br>PO Detail<br>Sell-Side Part Master<br>SO Detail<br>Supply/Demand Profile<br>Where Used |
| Resolution | Alert is cleared by update to PO or SO that does not exceed specified thresholds. |

2.10 Unplaced Purchase Order

An Unplaced Purchase Order rule is provided to identify planned purchase orders for which an actual purchase order has not yet been placed.

| | |
|---|---|
| Rule Processing | Find all Planned Purchase Orders for a P/N where Start Date <= (today + lookahead). Sum the quantity for all Purchase Orders for this P/N where ORDER_PLACE_DATE > PLANNED_ORDER.PLAN_DATE. If the summed quantity of the Purchase Orders equals or exceeds all the (quantities for the Planned Purchase Order - (Quantity Short Percent * quantities for the Planned PO)), no alert is created. Otherwise, the planned purchase orders will be sorted by ORDER_START_DATE in ascending order. Starting with the first Planned Purchase Order, subtract its quantity for the sum. If the sum is still positive, proceed to the next Planned Purchase Order on the list. If it is negative, this is the Planned Purchase Order for which an alert should be created. |
| Data Dependency | Rule is configured for the Buy-Side Partner and should be run when the MRP data is received and when PO's are received. |
| Rule Properties | General Properties:<br>Buy-Side Partner<br>Quantity Short Percent<br>Look Ahead Days |
| Escalation Properties | Three levels: Age (In Days); Role. Participants include the enterprise, Buy-Side Partner. |
| Alert Summary Display | Alert Generate Date<br>Buy-Side Partner<br>MRP Run Date<br>Enterprise's P/N<br>Order Start Date<br>MRP Required Delivery Date<br>Days Late<br>Planned PO Quantity |
| Alert Detail Display | Details:<br>Alert Generate Date<br>Buy-Side Partner<br>Properties:<br>MRP Run Date<br>Enterprise's P/N<br>P/N Description<br>Order Start Date<br>MRP Required Delivery Date<br>Order Quantity<br>Variance:<br>Quantity Short<br>Quantity Short Percent<br>Days Late<br>Configuration:<br>Buy-Side Partner<br>Quantity Short Percent<br>Look Ahead Days |
| Drill Down(s) | Approved Vendor List<br>Buy-Side Part Master<br>Demand Pegging<br>Notification History<br>Supply/Demand Profile<br>Where Used |
| Resolution | Alert is cleared by receipt of update to Planned Purchase Orders (MRP Load) or new PO arrives. |

2.11 Late Purchase Order Receipt

A Late Purchase Order Receipt rule is provided to identify purchase orders that have late receipts to the Buy-Side Partner.

| | |
|---|---|
| Rule Processing | Compare PO Line Item's Delivery Date against today and create an alert for those conditions where the Delivery Date is earlier than today minus configured number of days late, but the P/N has not been received. |
| Data Dependency | Rule is configured for the Buy-Side Partner and should be run when Buy-Side Partner's have submitted their PO's. |
| Rule Properties | General Properties:<br>Buy-Side Partner<br>Number of Days Late |
| Escalation Properties | Three levels: Age (In Days); Role. Participants: Enterprise; Buy-Side Partner. |
| Alert Summary Display | Alert Generate Date<br>Buy-Side Partner<br>PO Number<br>Enterprise P/N<br>Delivery Date<br>Ship Date<br>Shipped? |

| | -continued |
|---|---|
| Alert Detail Display | Details:<br>Alert Generate Date<br>Buy-Side Partner<br>Sell-Side Partner<br>Properties:<br>PO Number<br>Enterprise P/N<br>P/N Description<br>PO Delivery Date<br>Remaining Quantity Due<br>PO Last Updated in system<br>SO Number<br>Mfr P/N<br>P/N Description<br>SO Delivery Date<br>SO Ship Date<br>Remaining Quantity Due (from SO detail)<br>SO Last Updated in system<br>Variance:<br>Days Late<br>Configuration:<br>Buy-Side Partner<br>Max Days Late |
| Drill Down(s) | Approved Vendor List<br>Demand Pegging<br>Buy-Side Part Master<br>Notification History<br>PO Detail<br>SO Detail<br>Supply/Demand Profile<br>Where Used |
| Resolution | Alert is cleared by receipt data on PO or reschedule of PO. |

2.12 Late Sales Order Shipment

A Late Sales Order Shipment rule is provided to identify sales orders having late ship dates to the Buy-Side Partner.

| | |
|---|---|
| Rule Processing | Compare SO Line Item's Ship Date against today. Create an alert for those conditions where the Ship Date is earlier than today minus configured days late but the P/N has not been shipped based on sales order ship date and the shipped quantity from the sales order shipment history. |
| Data Dependency | Rule is configured for the Buy-Side Partner and should be run when all Sell-Side Partners have submitted their Sales Order data. |
| Rule Properties | General Properties: Buy-Side Partner; Number of Days Late |
| Escalation Properties | Three levels: Age (In Days); Role. Participants: Enterprise; Buy-Side Partner, Sell-Side Partner. |
| Alert Summary Display | Alert Generate Date<br>Buy-Side Partner<br>PO Number<br>Enterprise P/N<br>PO Delivery Date<br>Sell-Side Partner<br>SO Number<br>Mfr P/N<br>SO Ship Date |
| Alert Detail Display | Details:<br>Alert Generate Date<br>Buy-Side Partner<br>Sell-Side Partner<br>Properties:<br>PO Number<br>Enterprise P/N<br>P/N Description<br>PO Delivery Date<br>Remaining Quantity Due<br>PO Last Updated in system<br>SO Number<br>Mfr P/N<br>P/N Description |

| | -continued |
|---|---|
| | SO Delivery Date<br>SO Ship Date<br>Remaining Quantity Due<br>SO Last Updated in system<br>Variance:<br>Days Late<br>Configuration:<br>Buy-Side Partner<br>Max Days Late |
| Drill Down(s) | Buy-Side Part Master<br>Demand Pegging<br>Notification History<br>PO Detail<br>Sell-Side Part Master<br>SO Detail<br>Supply/Demand Profile<br>Where Used |
| Resolution | Alert is cleared by receipt of SO data with new shipment or change in SO ship date. |

2.13 Late Trigger Start

A Late Trigger Start rule is provided to identify Work Orders having late starts to the enterprise, based on late trigger starts.

| | |
|---|---|
| Rule Processing | If Quantity Due to Star is greater than the configured Maximum Quantity Short Allowed and Trigger date is earlier than today minus configured number of days late, then generate an alert. The "Quantity Due to Start" is Required Qty − (Start Qty + Cancel Qty). |
| Data Dependency | Rule is configured for Sell-Side Partner and should be run when the enterprise has submitted its Trigger data. The Sell-Side Partner in this case is the Partner who is building the component. |
| Rule Properties | General Properties: Sell-Side Partner; Number of Days Late; Maximum Quantity Short Allowed |
| Escalation Properties | Three levels: Age (In Days); Role. Participants: Enterprise; Sell-Side Partner |
| Alert Summary Display | Alert Generate Date<br>Trigger Number<br>Sell-Side Partner<br>Enterprise P/N<br>Trigger Date<br>Days Late<br>Quantity Due to Start |
| Alert Detail Display | Details:<br>Alert Generate Date<br>Sell-Side Partner<br>Properties:<br>Trigger Number<br>Enterprise P/N<br>P/N Description<br>Trigger Date<br>Start Quantity<br>Cancel Quantity<br>Required Quantity<br>Quantity Due to Start<br>Variance:<br>Days Late<br>Configuration:<br>Sell-Side Partner<br>Max Days Late<br>Maximum Quantity Short Allowed |
| Drill Down(s) | Enterprise Part Master<br>Demand Pegging<br>Notification History<br>Supply/Demand Profile<br>Where Used |
| Resolution | Alert is cleared when start quantity plus cancelled quantity is equal to required quantity. |

2.14 Supply/Demand Disconnect

A Supply/Demand Disconnect rule is provided to identify when a Partner's Gross Component Demand exceeds its Supply over the course of the planning period.

| | |
|---|---|
| Rule Processing | Detect when the cumulative aggregated Demand subtracted from the cumulative aggregated Supply goes from one period to the next, from a positive value to a negative value by more than the configured percent threshold when the P/N is within the configured percent of full lead time. When this condition is detected generate an alert for the negative period. If there is more than one period in a row that is negative, only generate an alert on the first change from positive to negative. In an embodiment, the number of days can only be configured if Percent of Full Lead Time is 100%. |
| Data Dependency | Rule is configured for a Partner and should be run when both Supply and Demand data has been posted for this Partner. |
| Rule Properties | General Properties: Partner; Percent Short; Percent of Full Lead Time; Number of Days Beyond Lead Time |
| Escalation Properties | Three levels: Age (In Days); Role. Participants: Enterprise; Partner. |
| Alert Summary Display | Alert Generate Date<br>Partner<br>Enterprise P/N<br>Period Start Date<br>Demand Quantity<br>Supply Quantity<br>Delta Quantity<br>Percent of Lead Time |
| Alert Detail Display | Details:<br>Alert Generate Date<br>Partner<br>Properties:<br>Demand Date/Time<br>Supply Date/Time<br>Enterprise P/N<br>Period Start Date<br>Demand Quantity<br>Supply Quantity<br>Lead Time Days<br>Excess Available at another Partner<br>Variance:<br>Quantity Percent Short<br>Percent of Lead Time<br>Configuration:<br>Buy-Side Partner<br>Percent of Full Lead Time<br>Number of Days beyond Full Lead Time |
| Drill Down(s) | Approved Vendor List<br>Demand Pegging<br>Excess Available<br>Notification History<br>Enterprise Part Master<br>Partner Part Master<br>Supply Detail<br>Supply/Demand Profile<br>Where Used |
| Resolution | Alert is cleared by receipt of new Demand or Supply data that does not exceed specified thresholds. |

The "excess available at another partner" property of the Alert Detail Display provides a display of the quantity of a particular component that is available at another partner. To support the excess visibility feature, the partner is configured to participate in showing excess visibility. If the setting in the partner configuration file of Partner Configuration mechanism 116 is "Yes", then the Partner can see other Partner's excess as well as show their available excess. If the setting in the partner file is "No", then they can neither see the excess of other partners, nor show their excess. Excess exists when all time cumulative supply is greater than cumulative demand for all time periods through the lead-time.

2.15 MRP Profile

An MRP Profile rule provides a dashboard summary by Partner that illustrates the impact to the supply chain due to MRP changes for all of their part numbers.

| | |
|---|---|
| Rule Processing | Calculate once MRP data is loaded, totals for all P/N for this Partner:<br>Planned Orders that are in Lead Time<br>Planned Orders that are between Lead Time and Lead Time + 4 weeks<br>Supply/Demand Disconnects in Lead Time<br>Supply/Demand Disconnects between Lead Time and Lead Time + 4 weeks<br>PO's that need to be Pulled In (MRP Required Date is less than PO Required Delivery Date)<br>PO's that need to be Pushed Out (MRP Required Date is greater than PO Required Delivery Date)<br>Details displays totals for:<br>Baseline Forecast Disconnects broken out by Relative Baseline, Lead Time Baseline, and Fixed Baseline<br>Forecast Time Fence Disconnects |
| Data Dependencies | Rule is configured for a Partner and should be run once MRP for this Partner is loaded into the system or when Supply/Demand data is received for this Partner. |
| Rule Properties | General Properties: Partner |
| Escalation Properties | Three levels: Age (In Days); Role. Participants: Enterprise; Enterprise; Partner. Notification for this alert is done by sending to all users for the specified Partner for the role configured on the escalation profile (i.e., Master Schedulers and Planners for the entire Part Master for the CM). |
| Alert Summary Display | Alert Generate Date<br>Partner<br>MRP Plan Date<br>Planned Orders in Lead Time<br>Number of Supply/Demand Disconnects in Lead Time<br>PO's that need to be Pulled In |

|   |   |
|---|---|
|  | -continued |
|  | PO's that need to be Pushed Out |
|  | Total Relative Baseline Forecast Disconnects |
|  | Total Forecast Time Fence Disconnects |
| Alert Detail Display | Details |
|  | Alert Generate Date |
|  | Partner |
|  | Properties: |
|  | MRP Plan Date |
|  | Planned Orders in Lead Time |
|  | Planned Orders between Lead Time and Lead Time + 4 weeks |
|  | Number of Supply/Demand Disconnects in Lead Time |
|  | Number of Supply/Demand Disconnects between Lead Time and Lead Time + 4 weeks |
|  | PO's that need to be Pulled In |
|  | PO's that need to be Pushed Out |
|  | Relative Baseline Forecast Disconnect Totals |
|  | Lead Time Baseline Forecast Disconnect Totals |
|  | Fixed Baseline Forecast Disconnect Totals |
|  | Forecast Time Fence Disconnect Summary |
|  | Variance: |
|  | N/A |
|  | Configuration: |
|  | Partner |
| Drill Down(s) | No Links |
| Resolution | No resolution. |

2.16 Baseline Forecast Disconnect

A Baseline Forecast Disconnect rule is provided to identify the difference between the Buy-Side Partner's baseline forecast and the forecast of the partner for the current week.

|   |   |
|---|---|
| Rule Processing | Baseline is defined as: |
|  | Relative version number |
|  | Version number based on P/N's Lead Time |
|  | Fixed version number based on specified version indicated via a system property. |
|  | Compare current weeks forecast against the Baseline for the configured horizon. Calculate cumulative totals for the time period and identify the first period that exceeds the configured thresholds. |
| Data Dependency | Rule is configured for the Partner receiving the Forecast and should be run once a week after the Forecast is loaded into the system. |
| Rule Properties | General Properties: Partner (Receiver of the Forecast); Horizon; Relative Baseline Version Number; Cumulative Percent Change - Upper Bound; Cumulative Percent Change - Lower Bound |
| Escalation Properties | Three levels: Age (In Days); Role. Participants: Enterprise; Partner (Receiver of the Forecast). |
| Alert Summary Display | Alert Generate Date |
|  | Partner |
|  | Enterprise P/N |
|  | Plan Date |
|  | Relative Baseline - First Week Violated |
|  | Lead Time Baseline - First Week Violated |
|  | Fixed Baseline - First Week Violated |
| Alert Detail Display | Details: |
|  | Alert Generate Date |
|  | Partner |
|  | Properties: |
|  | Plan Date |
|  | Enterprise P/N |
|  | Period of First Disconnect |
|  | Cumulative Forecast Quantity |
|  | Cumulative Relative Baseline Quantity |
|  | Cumulative Lead Time Baseline Quantity |
|  | Cumulative Fixed Baseline Quantity |
|  | Variance: |
|  | Relative Baseline Cumulative Percent Change |
|  | Lead Time Baseline Cumulative Percent Change |
|  | Fixed Baseline Cumulative Percent Change |
|  | Allowed Percent Change |
|  | Configuration: |
|  | Partner Horizon |
|  | Relative Baseline Version Date |

| | |
|---|---|
| Drill Down(s) | Lead Time Version Date |
| | Fixed Forecast Version Date |
| | Upper Bound Cumulative Percent Change |
| | Lower Bound Cumulative Percent Change |
| | Buy-Side Part Master |
| | Forecast Waterfall |
| | Notification History |
| | Where Used |
| Resolution | No resolution. |

To support this rule, a table is stored in the database that will have a row for each Fiscal Quarter Forecast Period start date for the enterprise. This table will consist of two columns, PERIOD_NAME and START_DATE. The period name will be a string naming the period, 'FY 2000 Q4' for example. The start date will be the date of the first day in the period. To determine the fixed baseline forecast date to be used, the closest Fiscal Quarter Period Start that is less than or equal to the current date will be used.

2.17 Forecast Time Fence Disconnect

A Forecast Time Fence Disconnect rule is provided to identify the difference between Enterprise's Current Forecast and the previous week's forecast against the Partner's Time Fence Agreement.

| | |
|---|---|
| Rule Processing | The Time Fence is defined for a Partner and specifies the start period, end period and allowed percent change for that time bracket. Compare current's weeks forecast against previous weeks forecast. Generate an alert when the difference between the cumulative totals for the defined Partner's time fences exceeds the defined time fence percents by the configured thresholds. |
| Data Dependency | Rule is configured for the Partner and should be run once a week after the enterprise's Forecast is loaded into the system. |
| Rule Properties | General Properties: CM; Percent Change-Upper Bound; Percent Change-Lower Bound. |
| Escalation Properties | Three levels: Age (In Days); Role. Participants: Enterprise; Partner. |
| Alert Summary Display | Alert Generate Date |
| | Partner |
| | Enterprise P/N |
| | Plan Date |
| | Time Fence Start Period |
| | Time Fence End Period |
| | Total Percent Change |
| Alert Detail Display | Details: |
| | Alert Generate Date |
| | Partner |
| | Properties: |
| | Plan Date |
| | Enterprise P/N |
| | Time Fence Start Period |
| | Time Fence End Period |
| | Duration |
| | Variance: |
| | Periods |
| | Previous Value |
| | Current Value |
| | Change |
| | Percent Change |
| | Allowed Percent Change |
| | Configuration: |
| | Partner |
| | Partner Time Fence Profile-start period, end period, percent change allowed, . . . |
| | Upper Bound Percent Change |
| | Lower Bound Percent Change |

| | |
|---|---|
| Drill Down(s) | Forecast Waterfall |
| | Enterprise Part Master |
| | Notification History |
| | Where Used |
| Resolution | No resolution. |

2.18 Lead Time Disconnect

A Lead Time Disconnect rule is provided to identify differences in Lead Times between a Buy-Side Partner and a Sell-Side Partner.

| | |
|---|---|
| Rule Processing | Compare Buy-Side Partner's Lead Time against a Partner's Lead Time for a given P/N. Generate an alert if the Lead Time is different between the two partners. If a primary supplier is indicated, then their Lead Time is used for the comparison. If there is a split between Suppliers, use the longest Lead Time for the comparison. The e-mail only goes to the Supplier with the greatest Lead Time. |
| Data Dependency | Rule is configured for the Buy-Side Partner and should be run periodically when new Part Master's are loaded into the system. |
| Rule Properties | General Properties: Buy-Side Partner; Number of Days |
| Escalation Properties | Three levels: Age (In Days); Role. Participants: Enterprise; Buy-Side Partner; Sell-Side Partner |
| Alert Summary Display | Alert Generate Date |
| | Buy-Side Partner |
| | Enterprise P/N |
| | Sell-Side Partner |
| | Mfr P/N |
| | Delta Number of Days |
| Alert Detail Display | Details: |
| | Alert Generate Date |
| | Buy-Side Partner |
| | Properties: |
| | Enterprise P/N |
| | P/N Description |
| | Lead Time |
| | Mfr P/N |
| | P/N Description |
| | Lead Time |
| | Variance: |
| | Delta Number of Days |
| | Configuration: |
| | Partner |
| | Number of Days |
| Drill Down(s) | Buy-Side Part Master |
| | Notification History |
| | Sell-Side Part Master |
| | Where Used |
| Resolution | No resolution. |

2.19 Sales Order Change

A Sales Order Change rule is provided to identify PO's that are changing and will affect current Sales Orders.

| | |
|---|---|
| Rule Processing | Compare changes to PO need date (current MRP Required Delivery Date) within the configured Horizon. If the Required Date is earlier than the Delivery Date and (Delivery Date-Required Date) > Number of Days Late, then generate an alert. Or if the Required Date is later than the Delivery Date and (Required Date-Delivery Date) is greater than Number of Days Early, then generate an alert. |
| Data Dependency | Rule is configured for the Sell-Side Partner and should be run when new MRP and PO data is available. |
| Rule Properties | General Properties: Sell-Side Partner; Horizon Days; Number of Days Late; Number of Days Early. |
| Escalation Properties | Three levels: Age (In Days); Role. Participants: Enterprise; Buy-Side Partner; Sell-Side Partner. |
| Alert Summary Display | Alert Generate Date<br>Buy-Side Partner<br>PO Number<br>Enterprise P/N<br>PO Delivery Date<br>Sell-Side Partner<br>SO Number<br>Mfr P/N<br>Delta Number of Days |
| Alert Detail Display | Details:<br>Alert Generate Date<br>Buy-Side Partner<br>Properties:<br>PO Number<br>Enterprise P/N<br>P/N Description<br>MRP Required Date<br>PO Delivery Date<br>Remaining Quantity Due<br>Lead Time<br>PO Last Updated in system<br>SO Number<br>Mfr P/N<br>P/N Description<br>SO Delivery Date<br>SO Ship Date<br>Remaining Quantity Due<br>Lead Time<br>SO Last Updated in system<br>Variance:<br>Delta Number of Days<br>Configuration:<br>Partner<br>Start Period<br>Horizon<br>Number of Days Late<br>Number of Days Early |
| Drill Down(s) | Notification History<br>PO Detail<br>Sell-Side Part Master<br>SO Detail |
| Resolution | No resolution. Produce each week after MRP data received. |

2.20 Top Level Demand Disconnect

A Top Level Demand Disconnect rule is provided to identify the difference between the forecast of the enterprise and the contract manufacturer's MPS load.

| | |
|---|---|
| Rule Processing | Compare the enterprise Partner's forecast against the contract manufacturer's MPS load and generate an alert if the difference between each cumulative forecast exceeds the configured thresholds. Only the first period in violation is flagged in the alert. |
| Data Dependency | Rule is configured for the CM and should be run weekly when the enterprise's Forecast is generated and the MPS data is loaded. |
| Rule Properties | General Properties: CM; Start Period; Horizon; Cumulative Percent Change-Upper Bound; Cumulative Percent Change-Lower Bound |
| Escalation Properties | Three levels: Age (In Days); Role. Participants: Enterprise; CM |
| Alert Summary Display | Alert Generate Date<br>CM<br>Enterprise P/N<br>Enterprise Plan Date<br>CM Plan Date<br>Period<br>Delta Quantity Percent |
| Alert Detail Display | Details:<br>Alert Generate Date<br>CM<br>Properties:<br>Plan Date<br>Enterprise P/N<br>CM Plan Date<br>Period<br>Demand Quantity<br>MPS Quantity<br>Variance:<br>Delta Cumulative Quantity Percent<br>Configuration:<br>Partner<br>Start Period<br>Horizon<br>Upper Bound Percent Change<br>Lower Bound Percent Change |
| Drill Down(s) | Forecast Profile<br>Notification History |
| Resolution | No resolution. |

2.21 Lead Time/Delivery Date Disconnect

A Lead Time/Delivery Date Disconnect rule is provided to identify purchase orders that have been placed with Lead Times different than quoted Lead Times.

| | |
|---|---|
| Rule Processing | Compare buy-side Partner's PO delivery date, MRP Required date, and current date + lead-time. An alert should be generated if either of the following conditions is TRUE:<br>(1) The MRP Required Date is later than or equal to the current date plus lead-time and the delivery date is later than the MRP Required date.<br>(2) The MRP Required Date is earlier than the current date plus lead-time and the delivery date is later than current date plus lead-time.<br>In a formula:<br>Let M = MRP Required Date, LT = today + lead time, and D = delivery date.<br>If (M >= LT & D > M) || (M < LT & D > LT) then Alert. |
| Data Dependency | Rule is configured for the Buy-Side Partner and should be run weekly when MRP and purchase order data is loaded. |
| Rule Properties | General Properties: Buy-Side Partner; Number of Days Late; Number of Days Early |
| Escalation Properties | Three levels; Age (In Days); Role. Participants: Enterprise; Buy-Side Partner; Sell-Side Partner. |
| Alert Summary Display | Alert Generate Date<br>Buy-Side Partner<br>PO Number<br>Enterprise P/N<br>PO Delivery Date<br>Sell-Side Partner<br>SO Number<br>Mfr P/N<br>Delta Number of Days |
| Alert Detail Display | Details:<br>Alert Generate Date<br>Buy-Side Partner<br>Properties: |

-continued

| | |
|---|---|
| | PO Number |
| | Enterprise P/N |
| | P/N Description |
| | PO Delivery Date |
| | Remaining Quantity Due |
| | Lead Time |
| | PO Last Updated in system |
| | SO Number |
| | Mfr P/N |
| | P/N Description |
| | SO Delivery Date |
| | SO Ship Date |
| | Remaining Quantity Due |
| | Lead Time |
| | SO Last Updated in system |
| | Variance: |
| | Delta Number of Days |
| | Configuration: |
| | Partner |
| | Number of Days Late |
| | Number of Days Early |
| Drill Down(s) | Buy-Side Part Master |
| | Notification History |
| | PO Detail |
| | Sell-Side Part Master |
| | SO Detail |
| Resolution | No resolution. |

2.22 Summary Bill of Material Disconnect

A Summary Bill of Material Disconnect rule is provided to identify the difference between Summary Bill of Materials for the enterprise and a Control Partner.

| | |
|---|---|
| Rule Processing | Fully explode the BoM to flatten out the tree and get rid of all the different levels. Valid data is based on that data which is effective as of today's date. Get Enterprise's Part Master for a build partner. Identify BoM control partner in order to cross reference to the Enterprise's BoM. Disconnects are based on the quantities for a given P/N being different between the Enterprise's BoM and the control Partner's. Disconnects for P/N that appear on one BoM but not the other are also disconnects. Alerts are generated based on either of these conditions. |
| Data Dependency | Rule is configured for the CM and should be run periodically when changes to the BoM are loaded. |
| Rule Properties | General Properties: CM. |
| Escalation Properties | Three levels: Age (In Days); Role. Participants: Enterprise; CM. |
| Alert Summary Display | Alert Generate Date Enterprise Partner CM Assembly P/N Component P/N Enterprise Quantity CM Quantity |
| Alert Detail Display | Details: Alert Generate Date CM Properties: Enterprise Partner Assembly P/N Component P/N Enterprise Quantities CM Partner CM Quantities Variance: Delta Quantity Configuration: Partner |
| Drill Down(s) | Buy-Side Part Master Notification History Sell-Side Part Master |
| Resolution | No resolution. |

4. Hardware Overview

Embodiments of the invention may be implemented in one or more sequences of computer program instructions that are stored on computer-readable media and executed by one or more processors. For the purpose of clarity and completeness, an example implementation of a computer system and computer-readable media are now described.

Figure 8:
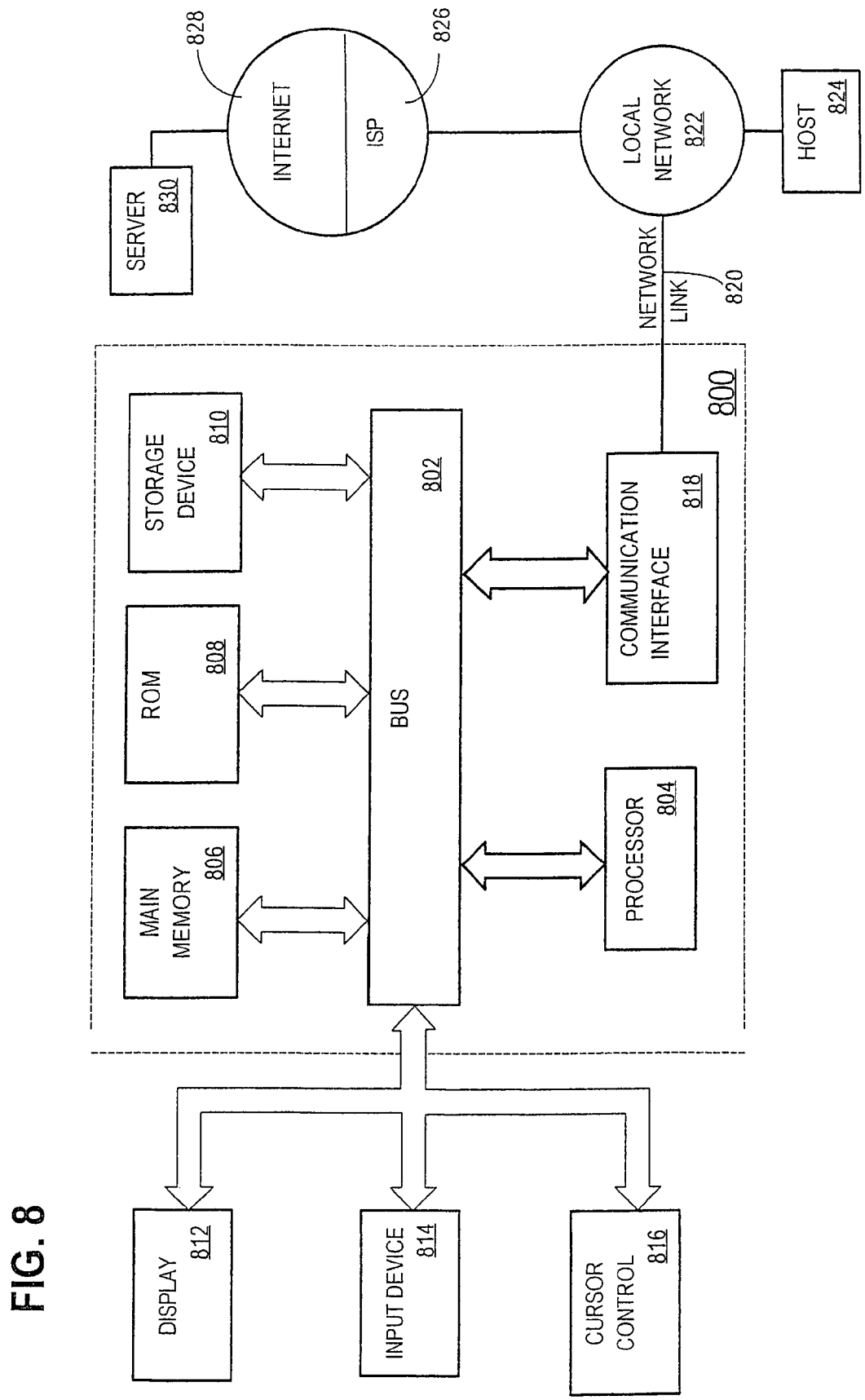
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for automatically identifying and resolving one or more discrepancies in an outsourced manufacturing supply chain in which a plurality of supply chain partners participate. According to one embodiment of the invention, automatically identifying and resolving one or more discrepancies in an outsourced manufacturing supply chain in which a plurality of supply chain partners participate is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for automatically identifying and resolving one or more discrepancies in an outsourced manufacturing supply chain in which a plurality of supply chain partners participate as described herein.

Processor 804 may execute the received code as it is received, and/or stored in storage device 810, or other non-volatile storage for later execution. In this manner, computer system 800 may obtain application code in the form of a carrier wave.

5. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automatically identifying and resolving one or more discrepancies in an outsourced manufacturing supply chain in which a plurality of supply chain partners participate, the method comprising the computer-implemented steps of: communicating to a direct contract manufacturer a forecast for a product, wherein the direct contract manufacturer is a manufacturer of the product and is a supply chain partner in the plurality of supply chain partners; receiving a master schedule and a gross demand for the product from the direct contract manufacturer; receiving first supply chain event information representing one or more first supply chain events from three or more supply chain partners at three or more respective levels of a supply chain at a database with which each of the supply chain partners communicate over a network; periodically applying one or more rules to the first supply chain event information, wherein the one or more rules are stored in a database; generating one or more alerts pertaining to one or more discrepancies that are found in the supply chain event information, based on applying the rules; communicating one of the alerts to the three or more supply chain partners at the three or more respective levels of the supply chain who are participating in a transaction to which the discrepancies relate; receiving second information that represents a second supply chain event that resolves the alert; resolving the alert in the database based on the second information; and periodically escalating the alert to one or more pre-defined parties associated with each of the supply chain partners who are participating in the transaction to which the discrepancies relate, until the second information is received.

2. The method as recited in claim 1, wherein periodically applying rules comprises the steps of applying an Expected Delivery Disconnect rule to identify one or more differences between a Buy-Side Partner's PO (Purchase Order) delivery date and quantity and a Sell-Side Partner's Sales Order delivery date and quantity.

3. The method as recited in claim 1, wherein periodically applying rules comprises the steps of applying an Unplaced Purchase Order rule to identify planned purchase orders for which an actual purchase order has not yet been placed.

4. The method as recited in claim 1, wherein periodically applying rules comprises the steps of applying a Late Purchase Order Receipt rule to identify purchase orders that have late receipts to a Buy-Side Partner.

5. The method as recited in claim 1, wherein periodically applying rules comprises the steps of applying a Late Sales Order Shipment rule to identify sales orders having late ship dates to the Buy-Side Partner.

6. The method as recited in claim 1, wherein periodically applying rules comprises the steps of applying a Late Trigger Start rule to identify Work Orders having late starts to the enterprise, based on late trigger starts.

7. The method as recited in claim 1, wherein periodically applying rules comprises the steps of applying a Supply/Demand Disconnect rule to identify when a Partner's Gross Component Demand exceeds its Supply over the course of the planning period.

8. The method as recited in claim 1, wherein periodically applying rules comprises the steps of applying a Baseline Forecast Disconnect rule to identify a difference between a baseline forecast of a Buy-Side Partner and a forecast of said partner for a current week.

9. The method as recited in claim 1, wherein periodically applying rules comprises the steps of applying a Lead Time Disconnect rule to identify one or more differences in Lead Times between a Buy-Side Partner and a Sell-Side Partner.

10. The method as recited in claim 1, wherein periodically applying rules comprises the steps of applying a Sales Order Change rule to identify one or more purchase orders that have changed and that will affect current Sales Orders.

11. The method as recited in claim 1, wherein periodically applying rules comprises the steps of applying a Top Level Demand Disconnect rule to identify one or more differences between a forecast of the enterprise and a master production schedule load of a contract manufacturer that is one of the supply chain partners.

12. The method as recited in claim 1, wherein periodically applying rules comprises the steps of applying a Lead Time/Delivery Date Disconnect rule to identify one or more purchase orders that have been placed with Lead Times different than quoted Lead Times.

13. An apparatus for automatically identifying and resolving one or more discrepancies in an outsourced manufacturing supply chain in which an enterprise and a plurality of its supply chain partners participate, comprising: a network interface that is coupled to the data network for receiving one or more packet flows therefrom; a processor; one or more stored sequences of instructions which, when executed by the processor, cause the processor to carry out the steps of: communicating to a direct contract manufacturer a forecast for a product, wherein the direct contract manufacturer is a manufacturer of the product and is a supply chain partner in the plurality of supply chain partners; receiving a master schedule and a gross demand for the product from the direct contract manufacturer; receiving first supply chain event information representing one or more first supply chain events from three or more supply chain partners at three or more respective levels of a supply chain at a database with which each of the supply chain partners communicate over a network; periodically applying one or more rules to the first supply chain event information, wherein the one or more rules are stored in a database; generating one or more alerts pertaining to one or more discrepancies that are found in the supply chain event information, based on applying the rules; communicating one of the alerts to the three or more supply chain partners at the three or more respective levels of the supply chain who are participating in a transaction to which the discrepancies relate; receiving second information that represents a second supply chain event that resolves the alert; resolving the alert in the database based on the second information; and periodically escalating the alert to one or more pre-defined parties associated with each of the supply chain partners who are participating in the transaction to which the discrepancies relate, until the second information is received.

14. The apparatus as recited in claim 13, wherein periodically applying rules comprises the steps of applying an Expected Delivery Disconnect rule to identify one or more differences between a Buy-Side Partner's PO (Purchase Order) delivery date and quantity and a Sell-Side Partner's Sales Order delivery date and quantity.

15. The apparatus as recited in claim 13, wherein periodically applying rules comprises the steps of applying an Unplaced Purchase Order rule to identify planned purchase orders for which an actual purchase order has not yet been placed.

16. An apparatus for automatically identifying and resolving one or more discrepancies in an outsourced manufacturing supply chain in which a plurality of supply chain partners participate, comprising: means for communicating to a direct contract manufacturer a forecast for a product, wherein the direct contract manufacturer is a manufacturer of the product and is a supply chain partner in the plurality of supply chain partners; means for receiving a master schedule and a gross demand for the product from the direct contract manufacturer; means for receiving first supply chain event information representing one or more first supply chain events from three or more supply chain partners at three or more respective levels of a supply chain at a database with which each of the supply chain partners communicate over a network; means for periodically applying one or more rules to the first supply chain event information, wherein the one or more rules are stored in a database; means for generating one or more alerts pertaining to one or more discrepancies that are found in the supply chain event information, based on applying the rules; means for communicating one of the alerts to the three or more supply chain partners at the three or more respective levels of the supply chain who are participating in a transaction to which the discrepancies relate; means for receiving second information that represents a second supply chain event that resolves the alert; means for resolving the alert in the database based on the second information; and means for periodically escalating the alert to one or more pre-defined parties associated with each of the supply chain partners who are participating in the transaction to which the discrepancies relate, until the second information is received.

17. The apparatus as recited in claim 16, wherein periodically applying rules comprises the steps of applying an Expected Delivery Disconnect rule to identify one or more differences between a Buy-Side Partner's PO (Purchase Order) delivery date and quantity and a Sell-Side Partner's Sales Order delivery date and quantity.

18. A computer-readable medium carrying one or more sequences of instructions for automatically identifying and resolving one or more discrepancies in an outsourced manufacturing supply chain in which a plurality of supply chain partners participate, which instructions, when executed by one or more processors, cause the one or more processors to carry out the steps of: communicating to a direct contract manufacturer a forecast for a product, wherein the direct contract manufacturer is a manufacturer of the product and is a supply chain partner in the plurality of supply chain partners; receiving a master schedule and a gross demand for the product from the direct contract manufacturer; receiving first supply chain event information representing one or more first supply chain events from three or more supply chain partners at three or more respective levels of a supply chain at a database with which each of the supply chain partners communicate over a network; periodically applying one or more rules to the first supply chain event information, wherein the one or more rules are stored in a database; generating one or more alerts pertaining to one or more discrepancies that are found in the supply chain event information, based on applying the rules; communicating one of the alerts to the three or more supply chain partners at the three or more respective levels of the supply chain who are participating in a transaction to which the discrepancies relate; receiving second information that represents a second supply chain event that resolves the alert; resolving the alert in the database based on the second information; and periodically escalating the alert to one or more pre-defined parties associated with each of the supply chain partners who are participating in the transaction to which the discrepancies relate, until the second information is received.

19. The medium as recited in claim 18, wherein periodically applying rules comprises the steps of applying an Expected Delivery Disconnect rule to identify one or more differences between a Buy-Side Partner's PO (Purchase Order) delivery date and quantity and a Sell-Side Partner's Sales Order delivery date and quantity.

* * * * *